(12) United States Patent
Anderson et al.

(10) Patent No.: US 11,106,473 B1
(45) Date of Patent: Aug. 31, 2021

(54) CONFIGURATION SYSTEM AND METHOD FOR INDIVIDUAL HIERARCHALLY MODELED SUB-SYSTEMS OF AN INTEGRATED COMPUTING SYSTEM

(71) Applicant: VCE IP Holding Company LLC, Richardson, TX (US)

(72) Inventors: Kenneth R. Anderson, Prosper, TX (US); Mark S. Tuck, Allen, TX (US); Daniel J. Butzer, McKinney, TX (US); Collin J. Miller, Fairview, TX (US); Darrell J. Dillon, Plano, TX (US)

(73) Assignee: EMC IP Holding Company LLC, Round Rock, TX (US)

( * ) Notice: Subject to any disclaimer, the term of this patent is extended or adjusted under 35 U.S.C. 154(b) by 232 days.

(21) Appl. No.: 16/547,121

(22) Filed: Aug. 21, 2019

Related U.S. Application Data

(63) Continuation of application No. 15/379,210, filed on Dec. 14, 2016, now Pat. No. 10,417,013.

(51) Int. Cl.
*G06F 9/44* (2018.01)
*G06F 9/445* (2018.01)
*H04L 12/24* (2006.01)

(52) U.S. Cl.
CPC ...... *G06F 9/44505* (2013.01); *H04L 41/0806* (2013.01); *H04L 41/0866* (2013.01)

(58) Field of Classification Search
CPC .................. H04L 41/0866; H04L 41/0873
See application file for complete search history.

(56) References Cited

U.S. PATENT DOCUMENTS

| | | | |
|---|---|---|---|
| 9,940,125 B1* | 4/2018 | Espy | G06F 8/65 |
| 2004/0015946 A1* | 1/2004 | Te'eni | G06F 8/61 |
| | | | 717/169 |
| 2014/0059570 A1 | 2/2014 | Nandyalam et al. | |
| 2014/0109094 A1 | 4/2014 | Datla et al. | |
| 2018/0048712 A1 | 2/2018 | Sarisky et al. | |

* cited by examiner

*Primary Examiner* — Albert Wang
(74) *Attorney, Agent, or Firm* — Polsinelli PC

(57) ABSTRACT

An integrated computing system configuration system includes a computer-based system that when executed, receives component definitions associated with physical components that are to be configured in a portion of a first sub-system of a first customized integrated computing system. Using the received component definitions, the system generates the first sub-system definition, which can be combined with a second sub-system definition to form a first integrated computing system. The system may also combine the first sub-system definition with another second sub-system definitions to form a second customized integrated computing system definition that is different from the first customized integrated computing system definition.

20 Claims, 19 Drawing Sheets

─ 1020

Workgroup Display Screen ─ 1022

| ICS Definition Name ─1024a | Long Form Description ─1024b | Cost ─1024c |
|---|---|---|
| ICS Proposal 1.0 | Initial quote provided to Customer | $52,295 |
| ICS Proposal 1.1 | Revise to add additional HDD memory | $56,009 |
| ICS Proposal 1.2 | Revise to replace HDD with solid-state memory | $68,000 |
| ICS Proposal 2.1 | Initial quote wi. added cooling capability | $102,335 |

1026 — Go Back    1028 — Print Form

FIG. 10B

CONFIGURATION SYSTEM AND METHOD FOR INDIVIDUAL HIERARCHALLY MODELED SUB-SYSTEMS OF AN INTEGRATED COMPUTING SYSTEM

CROSS-REFERENCE TO RELATED APPLICATION

This continuation application is related to and claims priority to U.S. Nonprovisional application Ser. No. 15/379,210 entitled "Configuration System and Method for Individual Hierarchally Modeled Sub-Systems of an Integrated Computing System," filed on Dec. 14, 2016, the entire contents of which is incorporated herein by reference for all purposes.

TECHNICAL FIELD

Aspects of the present disclosure relate to computing devices and, in particular, to a configuration system and method for configuring individual sub-systems of an integrated computing system.

BACKGROUND

Computing environments used by enterprises, such as corporations and universities, are often provided by multiple computing devices that function in a collaborative manner to meet the computing resource needs of the enterprise. With the advent of the cloud and increased needs for stable computing environments, integrated computing systems, such as converged infrastructures, were introduced that provide a standardized package of components combined into a single, optimized computing solution. Nevertheless, because the resource needs of each user is often unique, customization of these integrated computing systems remains an area for advancement.

SUMMARY

According to one aspect of the present disclosure, an integrated computing system configuration system includes a computer-based system that when executed, receives component definitions associated with physical components that are to be configured in a portion of a first sub-system of a first customized integrated computing system. Using the received component definitions, the system generates the first sub-system definition, which can be combined with a second sub-system definition to form a first integrated computing system. The system may also combine the first sub-system definition with another second sub-system definitions to form a second customized integrated computing system definition that is different from the first customized integrated computing system definition.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

FIGS. 10A and 10B illustrate example screenshots that may be displayed by the application for interacting with the user to receive information for generating multiple integrated computing system definitions according to one embodiment of the present disclosure.

DETAILED DESCRIPTION

Figure 1A:
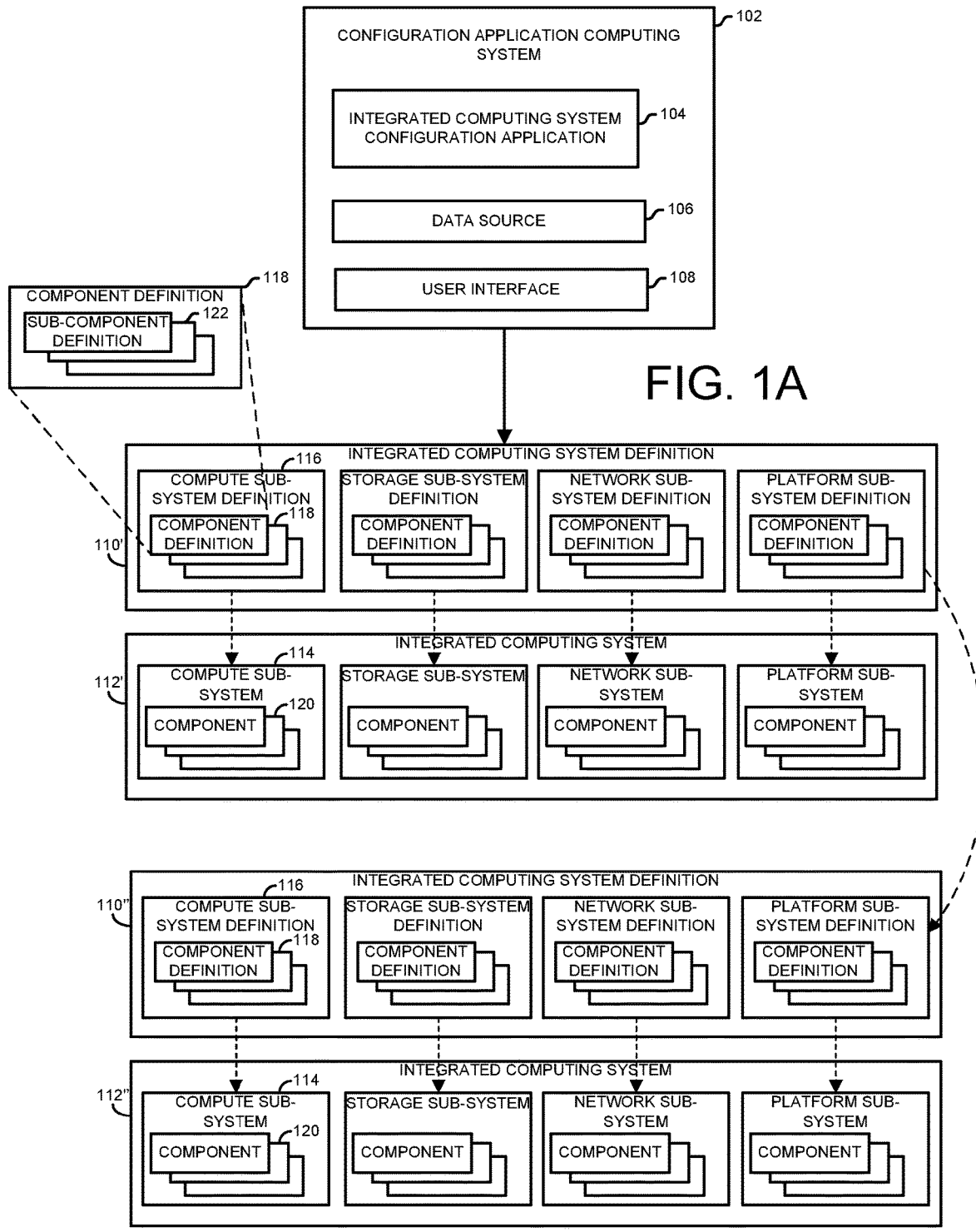
FIGS. 1A and 1B illustrate an example integrated computing system configuration system and associated data source according to one embodiment of the present disclosure.

Embodiments of the present disclosure provide a configuration system and method that can uniquely configure one or more hierarchally modeled sub-systems of an integrated computing system. Many integrated computing systems are often provided by several sub-systems that function together in a collaborative manner to perform one or more distributed computing services for users. Nevertheless, due to the high level of customizability of integrated computing systems, validation of their individual components to ensure compatibility with each other often becomes a challenging endeavor. Embodiments of the present disclosure may provide a solution to this problem by providing a framework for individual validation of one or more sub-systems of a customized integrated computing system so that these individually validated sub-systems may be imported into other customized integrated computing system designs, among other advantages. Thus, customization of integrated computing systems may be enhanced while reducing duplication of effort that often plagues current integrated computing system customization design efforts.

Integrated computing systems typically include multiple individual computing components that have been integrated into a completed (e.g., turn-key) product that functions in a collaborative manner to perform one or more distributed services. For example, a typical integrated computing system may include compute resources for execution of application, storage resources for persistent storage of information processed by the compute resources, and network resources for communicatively coupling certain groups of compute resources with certain other storage resources to perform execution of the applications in a structured and cost-efficient manner. It can be advantageous from a business perspective, to utilize components from different vendors based upon various factors that may include, for example, feature sets provided by various product offerings from certain vendors, and competitive prices at which these feature sets are provided. For example, a typical integrated computing system may be implemented with a sub-system having compute resources provided by one manufacturer (e.g., Dell™), another sub-system having network resources provided by another manufacturer (e.g., Cisco™), and yet another sub-system having storage resources provided by yet another manufacturer (e.g., EMC Corporation™) that utilize each of their competitive features in a synergistic manner to provide an optimal configuration for the integrated computing system.

In many cases, the rate of creating models to evaluate integrated computing system designs is too challenging and time consuming for integrated computing system architects or system administrators may be able to handle effectively. Current validation of integrated computing system definitions is often performed against a specific model. For example, an integrated computing system provider may provide multiple integrated computing system templates (e.g., models) that can be customized according to the customer's needs. This variation is becoming unsustainable for various reasons, such as when used with sales tracking tools, product engineers (e.g., integrated computing system architects) who create the back-end container/consumer model validation, and customers who are often required to sift through numerous models to find a cost-efficient solution to their design.

This problem is exacerbated by the fact that integration of differing components of an integrated computing system may encounter many dependencies that yield a relatively deterministic set of rules. One example dependency may include a maximum number of compute blades that can be paired with a certain type of storage array. Another example dependency may include a minimum network switch size to be used with a compute sub-system. When taking into account the myriad of differing types of components to be integrated, the number of dependencies can become very large. For example, a typical mid-range integrated computing system may encounter over 1,000 separate dependencies that should be resolved in order to form a valid integrated computing system configuration. This problem may be worsened by the fact that an initial proposed configuration may not be able to resolve all dependencies thus requiring that the integration process be re-started with a new initial configuration, which can be iteratively time consuming thus inefficiently using the scarce resources of an organization.

Figure 1B:
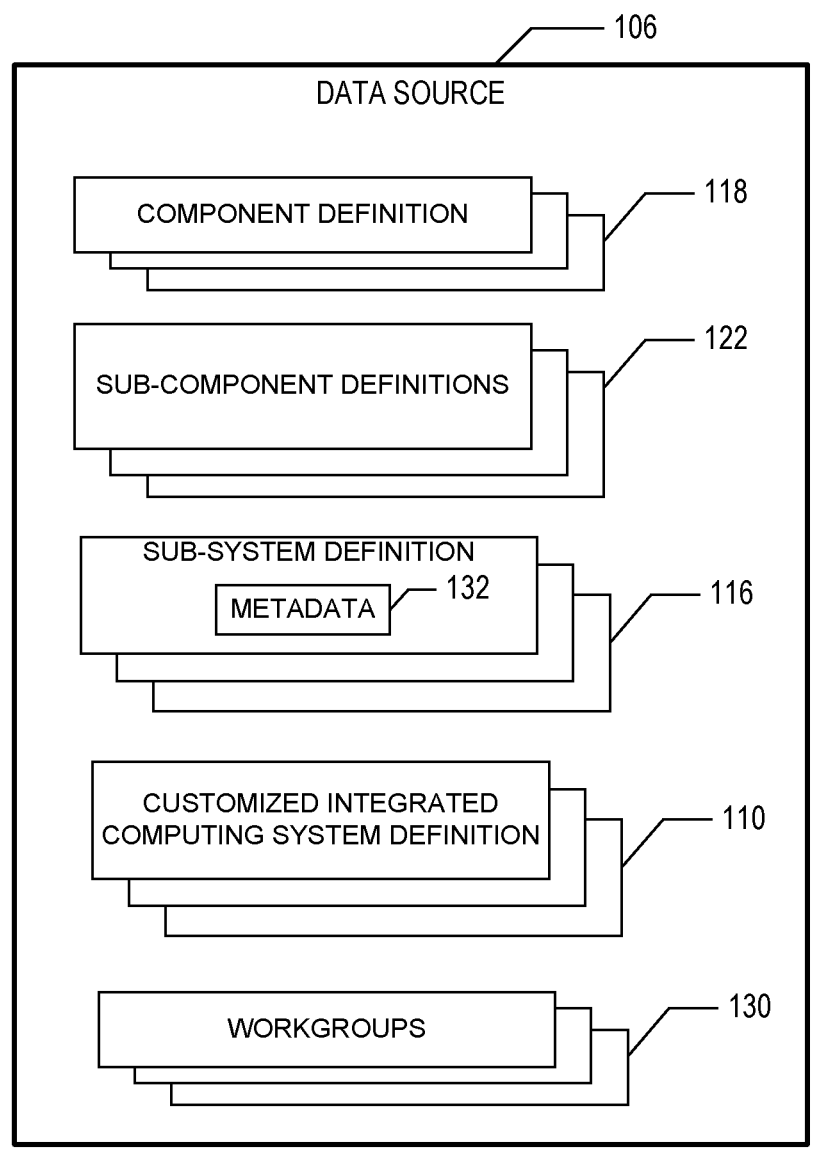

FIGS. 1A and 1B illustrate an example integrated computing system configuration system 100 according to one embodiment of the present disclosure. The integrated computing system configuration system 100 addresses the problems discussed above with conventional systems among other benefits and solutions. The system 100 includes a configuration application computing system 102 having an integrated computing system configuration application 104, a data source 106, and a user interface 108. The integrated computing system application 104 generates a first integrated computing system definition 110' representing a first customized integrated computing system 112' having multiple sub-systems 114. As will be described in detail below, application 104 receives user input, via the user interface 108, for generating individual customized sub-system definitions 116 representing the sub-systems 114 of the first integrated computing system 112' in a manner that allows those sub-system definitions 116 to be imported into a second customized integrated computing system definition 110". Additionally, the application 104 may provide for customization of certain components 120 of each sub-system 114 by receiving user input, via the user interface 108, for customizing certain sub-component definitions 122 representing constituent portions those components 120, thus forming a hierarchal customization model that can be re-used with ensuing customized integrated computing system designs.

Traditionally, many integrated computing system definitions have been evaluated and validated against specific models. Nevertheless, integrated computing system architects are facing quantities and complexities of models needed for presently available integrated computing system customization tools. With the continued proliferation in the quantity of models that are being implemented due to advances in customization, it has become necessary to evaluate smaller groups or subsets of a potential model configuration. By generating unique sub-system definitions 116, integrated computing system architects can evaluate designs against a customer/container model that may alleviate the need to generate myriads of differing overall integrated computing system models. Multiple unique validated sub-system definitions 116 can then be aggregated for evaluation against a single global definition of a customized integrated computing system 112. Each sub-system definition 116 is portable in that it can be used for guidance against differing configurations of integrated computing system definitions 110. Additionally, the sub-system definition 116 may be used for guidance throughout the serviceable lifespan of a deployed integrated computing system. For example, the sub-system definition 116 may be used to validate changes made to its respective sub-system 114 even after it has been deployed in service.

In general, a user can create one or more sub-system definitions 116 that are to be associated with a desired sub-system (e.g., a specific compute sub-system) and validate the sub-system definition 116, which can then be saved for later use, such as with a globally unique identifier (GUID). A sub-system definition 116 generally refers to a logical construct representing a physical sub-system of an integrated computing system, and may include information associated with one or more components to be included in the definition 116 along with how those components are coupled together. Thereafter, the validated sub-system definition 116 can be used for validation against other integrated computing system definitions. Additionally, each sub-system definition 116 may be tagged with hierarchy-oriented metadata including information, such as its eligibility against different combinations of other sub-system models, free-form text to provide quick assessment of its expected performance, compatibility, etc. The metadata tag may also have a structured name to enable its organization according to similar sub-system models, and provide for efficient searches.

Sub-system definitions 116 may include certain rule sets to ensure the proper operation as a group of components 120. These sub-system definitions 116 are portable in that they can be used for validation of an overall global integrated computing system definition 110 associated with a global integrated computing system 112. With the complexity and options of sub-system configurations that are becoming available, the use of sub-system definitions 116 allows validation of each sub-system configuration on differing integrated computing system definitions in a timely and cost efficient manner. The benefits to such a scheme not only impact integrated computing system architects and system administrators, but also help business aspects, such as management reporting that may be alleviated of the need to manage a myriad of differing configuration types that would otherwise grow at an unsustainable rate is it growing now.

The integrated computing system 112 may include any number and type of sub-systems 114 from which sub-system definitions 116 can be derived. For example, the integrated computing system 112 may include a compute sub-system 114, a network sub-system 114, a storage sub-system 114, and a platform sub-system 114. An example of one such a device may, for example, be a computing infrastructure (CI). Computing infrastructures (CIs) such as these are often implemented in environments where relatively high reliability and/or availability are desired, such as in an enterprise environment. In one embodiment, the customized integrated computing system 118 includes a CI, such as one of multiple CIs provided by Virtual Computing Environment (VCE) Corporation in Richardson, Tex. Nevertheless, it is contemplated that any computing infrastructure, such as a computer cluster, computing grid, blade array, and/or other computing infrastructure may be configured using the teachings of the present disclosure. The integrated computing system 112 may include a compute sub-system 114, a network sub-system 114, a storage sub-system 114, and a platform sub-system 114, such as described below with reference to FIGS. 2A and 2B. Nevertheless, the sub-systems 114 may include any group or subset of components 120 and/or sub-components 122 of an integrated computing system 112.

Each sub-system 114 may have multiple components 120 that may include any type that can be integrated into a customized integrated computing system 118. The components 120 may include, for example, data processing devices, data storage devices, servers, networking equipment, environmental control systems, and/or power management systems. In one embodiment, the components 120 may include any type of hardware that provides physical resources that support virtual objects, such as virtual machines, virtual switches, and/or virtual storage objects. These virtual objects may also include logical configuration constructs, such as storage partitions, port groups, virtual private clouds, virtual local area networks (LANs), and private virtual data centers (PVDCs).

The components 120 may also include individual components, such as stand-alone computing devices (e.g., a personal computer, such as a laptop or notebook computer, a workstation, or other processing device such as a tablet computer), or a structured combination of computing devices, such as sub-systems involving multiple computing devices, such as a blade array comprising multiple computing devices, a storage array network (SAN) having multiple hard disks, a network switch array having multiple independent switches (e.g., routers), and the like that are each housed in an enclosure and controlled by at least one control system, such as a dedicated computing system configured in the housing. For example, the components 120 may include multiple blades of a blade array provided by one component manufacturer (e.g., Dell™), multiple network switches provided by another component manufacturer (e.g., Cisco™), and/or multiple storage devices configured in a storage sub-system provided by yet another component manufacturer (e.g., EMC Corporation™).

In general, the sub-component definitions 122 represent their sub-component counterparts, and include information that describes the characteristics and qualities of its respective sub-component. For example, a sub-component definition 122 representing a hard disk drive may include information associated with the storage capacity (e.g., 1 Terabyte capacity), its nominal access time (e.g., 65 micro-seconds), and other information that may be used to validate its respective sub-component with the other sub-components of the sub-system 114. In one embodiment, the integrated computing system configuration application 104 receives component specifications from its component manufacturer to generate the sub-component definition 122. Additionally, the sub-component definitions 126 may be used in generating the customized integrated computing system configuration 116. The sub-component definitions 126 generally include abstracted representations of their component specification counterparts. That is, the sub-component definitions 126 may include only functional information associated with the component definitions 118, while other non-functional information, such as its manufacturer specific information (e.g., make, model, part number, etc.) has been removed.

Once the sub-component definitions 126 have been generated, the application 104 may receive a user selection, via the user interface 108, of one or more desired sub-component definitions 126, and compare the user selected sub-component definitions 122 against established sub-component definitions 122 included in each of one or more integrated computing system configuration templates 120 to automatically select an integrated computing system configuration template 120 that adequately provides a valid customized integrated computing system configuration. A valid integrated computing system configuration generally refers to a combined set of components 120 that, when implemented in a customized integrated computing system, have been validated to be interoperable with one another, and that the components collectively function at one or more performance levels desired by the user of the customized integrated computing system.

The data source 106 stores component definitions 118, sub-component definitions 122, sub-system definitions 116, and customized integrated computing system definitions 110. The data source 106 may also store one or more workgroups that each comprises a logical container for storing related integrated computing system definitions 110. The component definitions 118 and sub-component definitions 122 generally include information for the components 120 and sub-component portions of those components, respectively. The sub-system definitions 116 include information associated with a particular sub-system (e.g., compute, storage, network, platform, etc.) of an integrated computing system, while the customized integrated computing system definitions 110 include completed customized integrated computing system definitions and/or partially completed customized integrated computing system definitions. In one embodiment, each sub-system definition 116 may include a metadata portion 132 that stores, among other things, external dependencies 204 and/or freeform text that can be entered by a user and consumed when the sub-system definition 116 is imported into another integrated computing system definition 110.

The completed customized integrated computing system definitions may be those that form a valid customized integrated computing system 112 from which a customized integrated computing system 112 can be created, while the partially completed customized integrated computing system configurations may be those that are not yet ready for creation of a valid customized integrated computing system, but rather are saved for further customization at a later point in time. For example, a partially completed customized integrated computing system definition 110 may be generated by a user during a first login session and saved for further customization at a future point in time. As another example, the partially completed customized integrated computing system definition 110 may include one in which only one or a few sub-systems (e.g., compute sub-system, network sub-system, storage sub-system, etc.) has been completed. As will be described in detail below, one or more partially completed customized integrated computing system definitions may be combined to form a completed customized integrated computing system definition 110 from which a valid integrated computing system may be created.

The component definitions 118 include information associated with each component 120 that may, or may not, be selected for inclusion in a customized integrated computing system definition 110. For example, the provider that uses the integrated computing system configuration application 104 may obtain component definitions 118 from certain component manufacturers for each component 120 provided by that component manufacturer, and store the component definitions 118 in the data source 106. Thereafter, when the integrated computing system configuration application 104 is executed, it may access the component definitions 118 to generate sub-component definitions 118 associated with those components 120.

Figure 2:
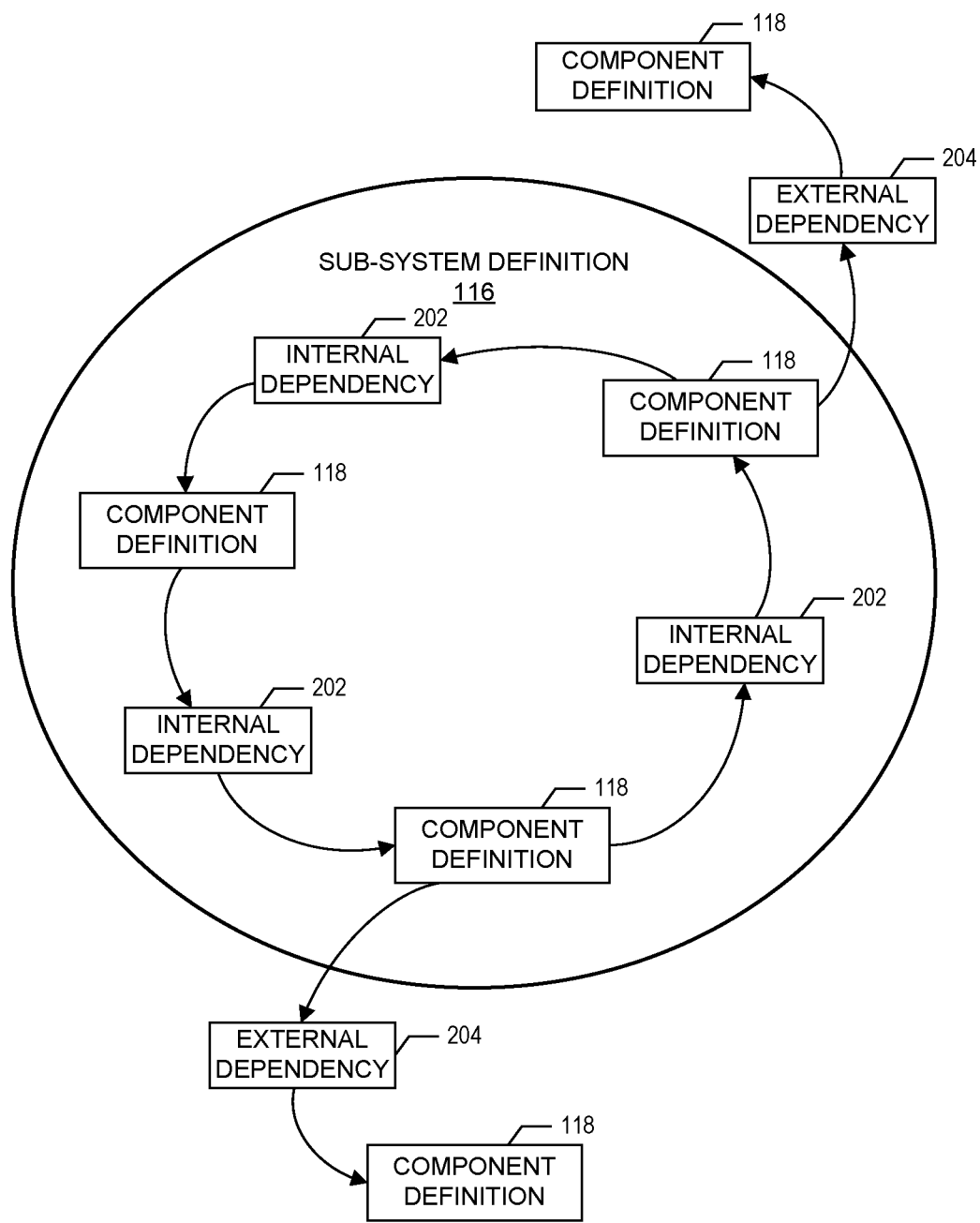
FIG. 2 illustrates several component definitions that may form one sub-system definition according to one embodiment of the present disclosure.

FIG. 2 illustrates several component definitions 118 that may form one sub-system definition 116 according to one embodiment of the present disclosure. As shown, the sub-system definition 116 includes three component definitions 118 for purposes of brevity and clarity of discussion. Nevertheless, it should be understood that the sub-system definition 116 may include any number and type of component definitions 118 without departing from the spirit and scope of the present disclosure, such as more than three component definitions 118, or less than three component definitions 118.

Each component definition 118 may have one or more dependencies to other component definitions 118 of the integrated computing system definition 110. Dependencies to other component definitions 118 within the sub-system definition 116 are referred to as internal dependencies 202, while those dependencies to other component definitions 118 outside of the sub-system definition 116 are referred to as external dependencies 204. Each component definition 118 may, or may not, have any internal dependencies 202 or external dependencies 204 to other component definitions 118. That is, each component definition 118 may have none, one, or many internal and/or external dependencies. In one embodiment, the internal dependencies 202 and external dependencies 204 may be stored in a metadata 132 portion of its respective component definition 118 in the data source 106.

Generally speaking, a dependency of a component definition 118 is a characteristic in which provisioning of that component definition 118 depends upon the operation of another component definition 118. For example, a component definition 118 of one computing device may include a communication port configured as a dynamic host routing protocol (DHCP) client. This DHCP client, however, cannot be properly provisioned until its corresponding DHCP server is configured as a resource on another component definition 118. As will be described in detail below, the application 104 may verify that all internal dependencies 202 are met to form a validated sub-system definition 116 that can be used to customize a second integrated computing system definition 110. That is, the application 104 may form a validated sub-system 114 by resolving all internal dependencies between the components 120 and/or sub-components 120 of that sub-system 114.

Figure 3A:
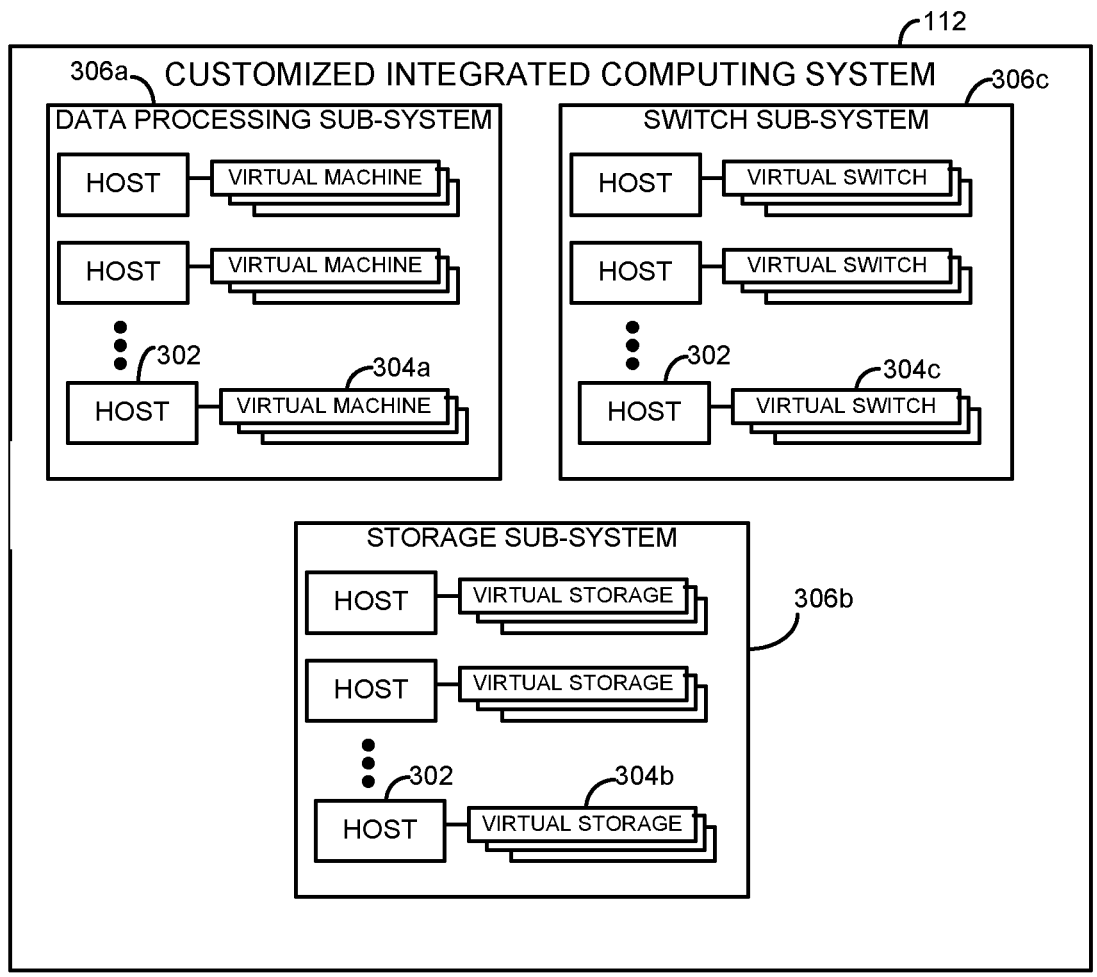
FIGS. 3A and 3B illustrate an example customized integrated computing system that may be configured by the integrated computing system configuration application according to one embodiment of the present disclosure.

FIG. 3A illustrates an example customized integrated computing system 118 that may be configured by the integrated computing system configuration application 104 according to one embodiment of the present disclosure. The particular example customized integrated computing system 118 as shown is a converged infrastructure package that is optimized for data storage utilizing various forms of redundancy for enhanced availability and reliability. For example, a customized integrated computing system 118 such as that shown includes components includes components found in VBLOCK™ infrastructure packages available from Virtual Computing Environment (VCE) Corporation, which is headquartered in Richardson, Tex. Nevertheless, other embodiments of a customized integrated computing system 118 may include additional, fewer, or different components than shown herein without departing from the spirit and scope of the present disclosure.

The customized integrated computing system 118 implemented as a converged infrastructure may be any type having multiple hosts 302 that each executes one or more virtual objects (e.g., virtual machines 304a, virtual storage objects 304b, and virtual switch objects 304c). The hosts of a converged infrastructure are often referred to as compute servers. Nevertheless, a 'host' may be any physical device and/or component that support the operation of virtual resources and services provided by those virtual resources. The particular customized integrated computing system 118 as shown includes several sub-systems, such as a data processing sub-system 306a, a data storage sub-system 306b, and a switch sub-system 306c. Nevertheless, it should be understood that other converged infrastructures may include additional, fewer, or different types of sub-systems without departing from the spirit and scope of the present disclosure.

In one aspect, the customized integrated computing system 118 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that other computing environments and converged infrastructure, such as a computer cluster, computing grid, blade array, and/or other converged infrastructure may be managed using the teachings of the present disclosure. For example, a converged infrastructure such as that shown includes components found in Vblock™ System infrastructure packages available from VCE, LLC, which is headquartered in Richardson, Tex.

In one aspect, the data storage sub-system 306b includes computer-readable memory structures for storing data used by the customized integrated computing system 118, which may include network attached storage (NAS) arrays and/or storage area network (SAN) arrays that are facilitated by multiple virtual objects (e.g., virtual storage objects 304b). The switch sub-system 306c provides for communication among the various sub-systems of the customized integrated computing system 118, and may include components, such as fabric interconnect systems, Ethernet switches/routers, multilayer director switches (MDSs), and the like. The data processing sub-system 306a executes applications that access, store, and otherwise manipulate data stored by the customized integrated computing system 118. For a particular example, either of the data storage sub-system 306b, the switch sub-system 306c, and/or the data processing sub-system 306a may comprise a blade computing platform having multiple hosts (e.g., blade computing devices) that each executes one or more virtual objects.

Each sub-system includes multiple hosts 302 that each executes one or more workloads or one or more virtual objects, which in this particular example, are virtual machines (VMs) 304a, virtual storage objects 304b, and virtual switch objects 304c. For example, virtual objects, such as the VMs 304a may include software-based operating systems that are emulated on their respective hosts, which are physical computing devices. For each host, its respective VMs may be managed by a hypervisor that provides a virtual environment for each VM's operation and controls various aspects of their operation. One example of a suitable hypervisor includes the VMWARE ESX™ software suite that is available from VMware Corporation, which is located in Palo Alto, Calif.

Figure 3B:
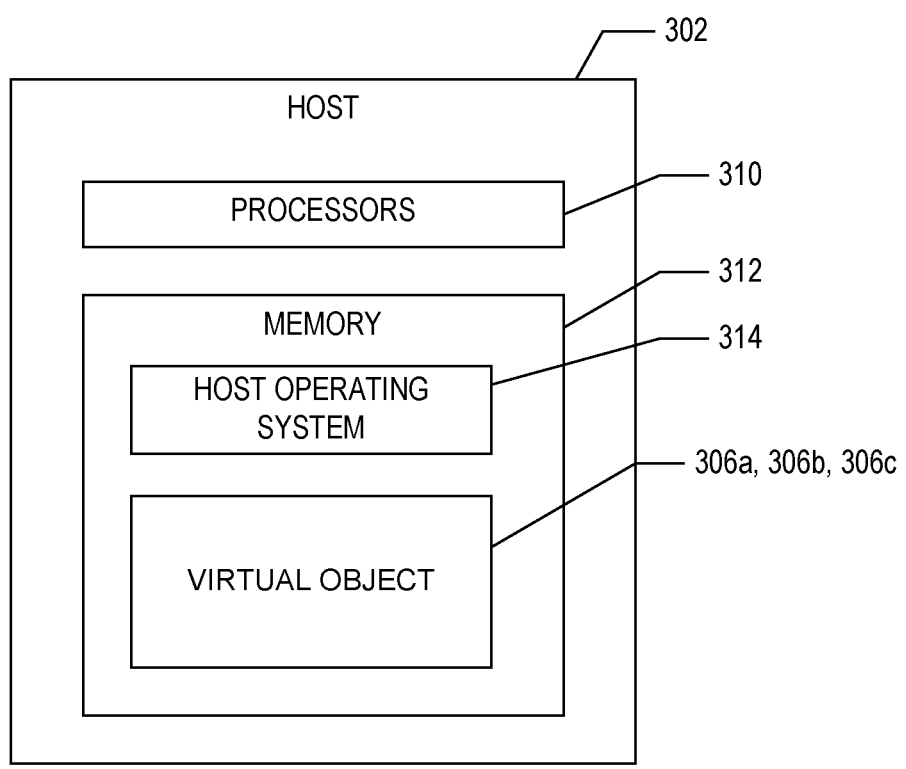

FIG. 3B illustrates an example host 302 implemented on each customized integrated computing system 118 according to one aspect of the application centric compliance management system 100. The host 302 is a computing or processing device that includes one or more processors 310 and a memory 312. For example, the host 302 can be a personal computer, such as a laptop or notebook computer, a workstation, or other processing device such as a personal digital assistant or a tablet computer. In a particular embodiment, the host 302 is a rack mounted host, such as blade host in which multiple blade hosts share a common backplane for communication with one another and for receiving power from a rack mounted power distribution unit. The memory 312 stores a host operating system 314 and one or more workloads or virtual objects (e.g., VMs 304a, virtual storage objects 304b, and virtual switch objects 304c) that are executed by the processor 310. The host operating system 312 controls and manages the operation of the virtual objects executed on the host 302. For example, control signaling for starting, stopping, and/or changing operating parameters of each virtual object is managed through the host operating system 312.

In general, the workloads or virtual objects (e.g., VMs 304a, virtual storage objects 304b, and virtual switch objects 304c) may be implemented as resources of a multi-tier computing environment. Each virtual object may be instantiated or deleted under control of the host operating system 314, which is in turn, controlled by the integrated computing system configuration application 104. That is, the host operating system 314 may be controlled by the integrated computing system configuration application 104 to instantiate new virtual objects are they are needed and destroyed to alleviate excess capacity in their associated hosts 302.

Although the customized integrated computing system 118 described above discloses one particular type of integrated computing system that may be configured by the integrated computing system configuration application 104, it should be understood that the integrated computing system configuration application 104 may be used to configure any computing environment that includes multiple components 120 (e.g., computing clusters, computing grids, blade arrays, etc.) may be viable alternatives.

Figure 4:
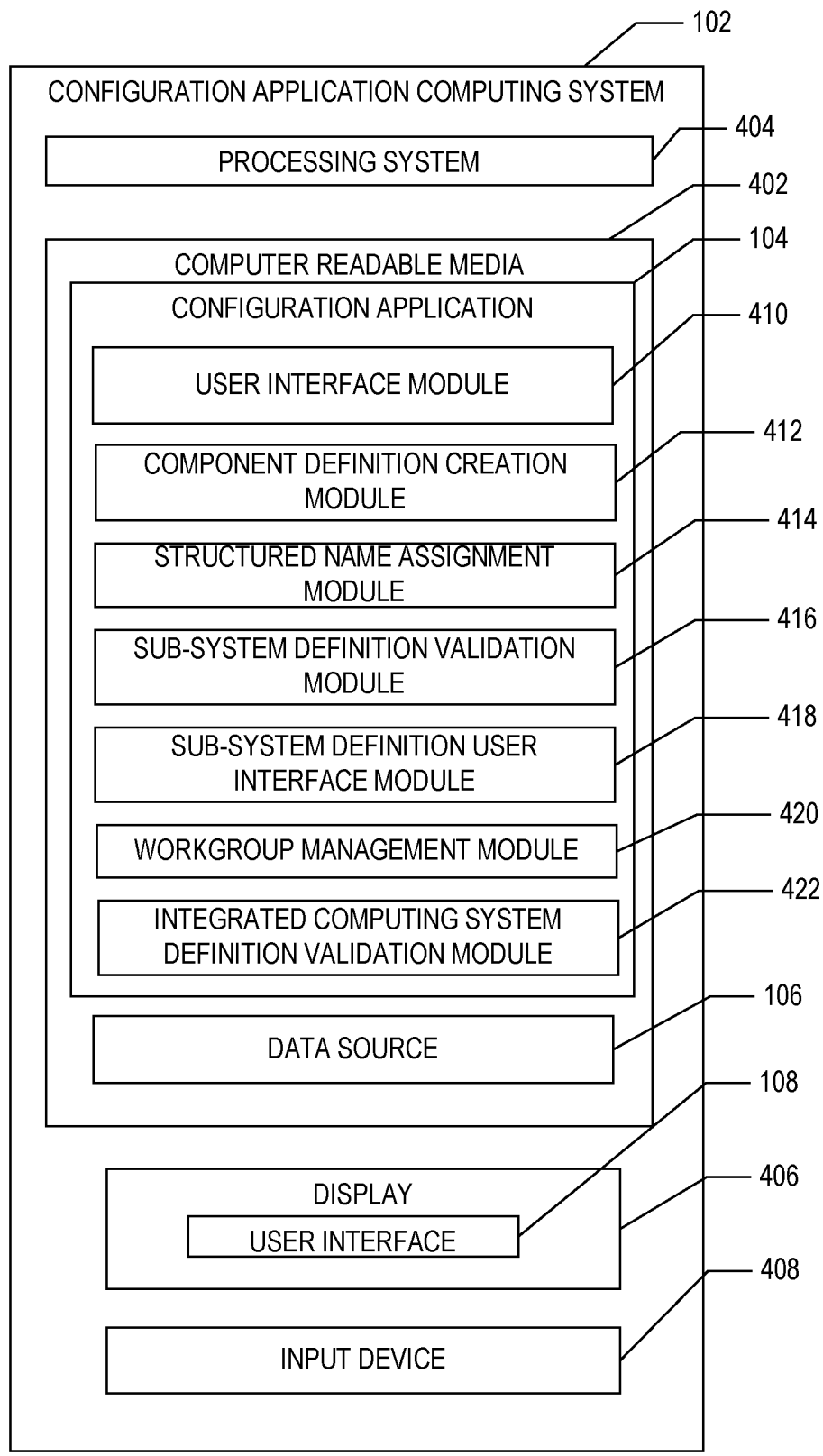
FIG. 4 is a block diagram depicting an example integrated computing system configuration application executed on the configuration application computing system according to one embodiment of the present disclosure.

Referring now in more detail to FIG. 4, a block diagram of an example integrated computing system configuration application 104 executed on the configuration application computing system 102, is depicted according to one aspect of the present disclosure. The integrated computing system configuration application 104 is stored in a computer readable media 402 (e.g., memory) and is executed on a processing system 404 of the configuration application computing system 102. For example, the integrated computing system configuration application 104 may include instructions that may be executed in an operating system environment, such as a Microsoft Windows™ operating system, a Linux operating system, or a UNIX operating system environment.

The computer readable medium 402 includes volatile media, nonvolatile media, removable media, non-removable media, and/or another available medium. By way of example and not limitation, non-transitory computer readable medium 402 comprises computer storage media, such as non-transient storage memory, volatile media, nonvolatile media, removable media, and/or non-removable media implemented in a method or technology for storage of information, such as computer readable instructions, data structures, program modules, or other data.

According to one embodiment, the configuration application computing system 102 also provides a user interface (e.g., a command line interface (CLI), a graphical user interface (GUI), etc.) 108 displayed on a display 406, such as a computer monitor, for displaying data. The configuration application computing system 102 also includes an input device 408, such as a keyboard or a pointing device (e.g., a mouse, trackball, pen, or touch screen) to enter data into or interact with the user interface 108. According to one aspect, the integrated computing system configuration application 104 includes instructions or modules that are executable by the processing system 402 as will be described in detail herein below.

A user interface module 410 facilitates the receipt of input data and/or output data from or to a user, respectively. In one example, the user interface 108 may communicate with other modules in the integrated computing system configuration application 104 to receive user input for manipulating or otherwise modifying the operation of the integrated computing system configuration application 104. As another example, the user interface 108 may receive user input for modifying and/or reviewing the customized integrated computing system configuration 116 on the display 406.

A component definition creation module 412 creates a component definition 118 that represents a component 120 of an integrated computing system 112. In one embodiment, the component definition creation module 412 uses an abstraction technique that reduces the amount of information by removing unique information not necessarily related to the component's operation. By using functionality information associated with each component rather than by using their unique identity (e.g., make, model number, etc.), the complexity of the system configuration may be reduced. Thus, integrated computing system configurations may be integrated in a shorter time frame than may be provided by conventional integrated computing system configuration systems. Additionally, the shorter time frame may enable the implementation of newly introduced components while avoiding the use of obsoleted or soon to be obsoleted components for implementation in integrated computing systems.

A structured name assignment module 414 communicates with the user to create a structured name for each component definition 118. In general, a component definition 118 is a logical construct representing a component, and may include one or more characteristics of that component, such as information associated with its performance, or interfacing capabilities, and the like, that may be used to assess whether that component is compatible with another component. The structured name possesses a hierarchal structure in which one or more prefixes having progressively ascending abstracted classifications may be appended to a free-form root name of the structured name. For example, a 10 Tera-byte hard disk drive manufactured by a certain component manufacturer 114 (e.g., ACME Corp.) may be labeled with a root name of '10TB-ACME' to provide readily accessible cognizance of its identity. The root name may then be prefixed by a hierarchal combination of prefixes of ascending abstraction, such as 'MEMORY|NON-VOLI-TILE|MAGNETIC|', in which the prefix 'MAGNETIC' denotes an abstracted classification of the hard disk drive, the prefix 'NON-VOLATILE' is a further abstracted classification of magnetic storage device, and 'MEMORY' is a yet further abstracted classification of non-volatile memory devices. Such a structure assigned to each component definition 118 provides for free-form selection of a readily recognizable nomenclature for the sub-component definition while enforcing a level of structure from which sub-component definitions representing a myriad of component types may organized in an efficient, structured manner.

A sub-system validation module 416 scans through each component definition 118 of the sub-system definition 116 to verify that all internal dependencies 202 are resolved. That is, the sub-system validation module 416 may ensure that internal dependencies 202 and/or external dependencies 204 of each component definition are met when combined to form the sub-system definition. For example, if an internal dependency 202 of one component definition 118 indicates that a minimum wattage level of a power supply component definition 118, the sub-system validation module 420 may identify the power supply component definition 118 for that sub-system definition 116 and verify that the power supply component definition 118 has at least the minimum wattage level as specified in the internal dependency 202. The sub-system validation module 416 may also scan through the component definitions 122 of the sub-system definition 116 to identify any external dependencies 204 and store the identified external dependencies 204 in the metadata 132 portion of the sub-system definition 118 stored in the data source 106. Thus, when the sub-system definition 118 is imported at a later time to generate a second integrated computing system definition 110, the external dependencies stored in the data source 106 may be obtained for validating the component definitions 122 in the imported sub-system definition 118 against the component definitions 122 in the other sub-system definitions 116 of the second integrated computing system definition 110.

A sub-system definition user interface module 418 generates a user interface for displaying the available sub-system definitions 116 stored in the data source 106, and obtaining user selection of one of the sub-system definitions 116 to be included in the customized integrated computing system definition 110. In one embodiment, the sub-system definition user interface module 418 may display the sub-system definitions 116 in a multi-dimensional display structure having rows and columns in which the sub-system definitions 116 may be sorted according to a first criteria relevance along the rows and sorted according to a second criteria relevance along the columns of the multi-dimensional display structure. Further, the sub-system definition user interface module 41 may display the sub-system definitions 116 that have been sorted according to a third criteria relevance as tiered tables, thus enabling the sub-system definition user interface module 418 to simultaneously sort and display sub-system definitions 116 among three criteria. Additionally, the type of criteria may be selected by the user.

In one embodiment, the sub-system definition user interface module 418 filters the sub-system definitions 116 according to their validation level and provides for sorting of the sub-system definitions 116 according to a validation level criteria. In general, the validation level of a sub-system definition is an estimated, proportional value indicating how well the sub-system definition 116 is validated with other sub-system definitions 116 in the integrated computing system definition 110. For example, a sub-system definition 116 having relatively few external dependencies to other sub-system definitions 116 will have a relatively higher validation level than another sub-system definition 116 having a relatively large number of external dependencies to the other sub-system definitions 116 in the integrated computing system definition 110. Furthering this example, a sub-system definition 116 having 10 unresolved dependencies would have a higher validation level than another sub-system definition 116 having 20 unresolved dependencies. Such a criteria may be useful for identifying those sub-system definitions 116 that can be incorporated into the integrated computing system definition 110 with relatively little amount of additional modifications to provide a validated integrated computing system definition 110.

A workgroup management module 420 manages workgroups of integrated computing system definitions 110 that are generated by the system 100. In general, a workgroup 130 comprises a logical container for storing multiple integrated computing system definitions 110 that may be related to one another. For example, a designer of an integrated computing system definition 110 may generate multiple integrated computing system definitions 110 that differ slightly from one another so that a comparison may be made as to an optimum configuration that yields the greatest benefit at the lowest cost. In such a case, a baseline integrated computing system definition 110 may be generated and stored in a particular workgroup 130. Next, the baseline integrated computing system definition 110 may be modified and stored as a second integrated computing system definition 110 in the workgroup 130 so that a report may be generated for comparing the relative benefits of each integrated computing system definition 110 to aid in selecting an optimum configuration desired by the integrated computing system designer.

A integrated computing system definition validation module 422 validates the integrated computing system definition 110 to ensure that most or all internal dependencies and external dependencies are resolved. In one embodiment, the integrated computing system definition validation module 422 may automatically make modifications to the integrated computing system definition 110 so resolve certain dependencies. For example, the integrated computing system definition validation module 422 may automatically modify the integrated computing system definition 110 when only one option is available to resolve a particular dependency. In another embodiment, the integrated computing system definition validation module 422 may generate a user interface for receiving user selection of a modification for resolving an internal or external dependency. For example, if multiple modifications are available for resolving an internal or external dependency, the integrated computing system definition validation module 422 may display the available modifications on the user interface so that the user may select a desired modification to be performed on the integrated computing system definition 110 for resolving the dependency.

It should be appreciated that the modules described herein are provided only as examples, and that the application 104 may have different modules, additional modules, or fewer modules than those described herein. For example, one or more modules as described in FIG. 4 may be combined into a single module. As another example, certain modules described herein may be encoded on, and executed on other computing systems, such as on one remotely coupled to the configuration application computing system 102.

Figure 5A:
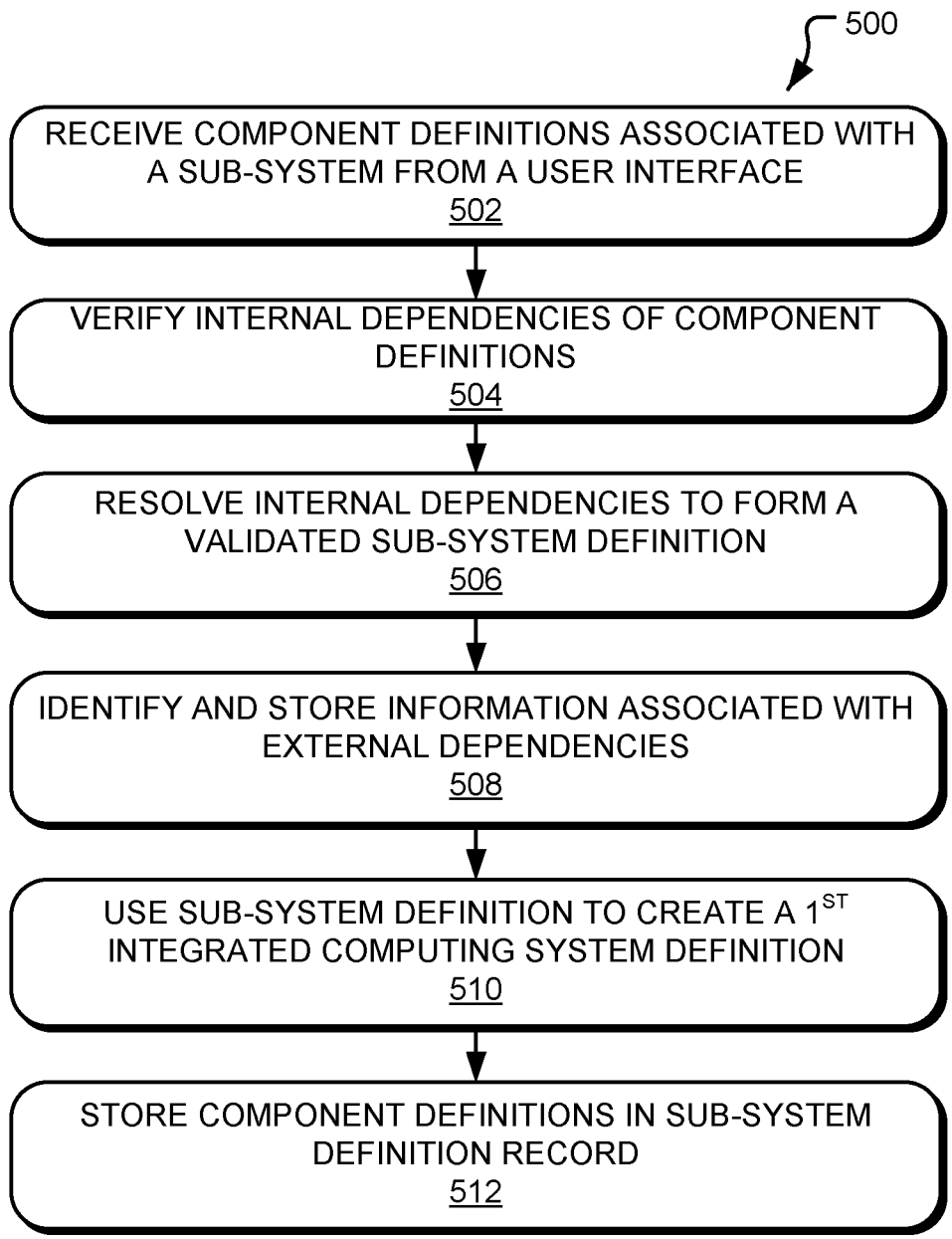
FIG. 5A illustrates an example process that may be performed by the application to create a customized sub-system definition that can integrated into an integrated computing system configuration according to one embodiment of the present disclosure.

FIG. 5A illustrates an example process 500 that may be performed by the application 104 to create a customized sub-system definition 116 that can integrated into an integrated computing system configuration 116 according to one embodiment of the present disclosure. Initially, component definitions 118 are generated for each of the components that are to be made available for inclusion in the customized sub-system definition 116.

In step 502, the application 104 receives, such as through the user interface 108, a selection of one or more component definitions 126 to be included in the customized sub-system definition 116. The component definitions 126 may include any type and at any desired level of hierarchy in the corpus (e.g., gamut) of available component definitions 126. For example, the application 104 may receive user selection of a top level component definition 126 and/or one or more sub-component definitions 122 representing one or more sub-components 120 of a component 120.

At step 503, when user selection of user supplied component definitions 126 have been obtained, the application 104 performs a validation process to determine whether all internal dependencies 202 are resolved. For example, the application 104 may iteratively scan each component definition 116 in the sub-system definition to ensure that all internal dependencies 202 are met, such as those dependencies 202 requiring the existence of certain other component definitions 116 within the sub-system definition. Thereafter, the application 104 resolves the internal dependencies 202 to form a validated sub-system definition 116 at step 506. The application 104 may also identify any external dependencies 204 of the component definitions 122 and store information associated with the external dependencies 204 as metadata 132 in the data source 106 at step 508. The application 104 then uses the customized sub-system definition 116 to create a first integrated computing system definition 110 at step 510. For example, the application 104 may receive user input for receiving component definitions 122 associated with other sub-system definitions 116 and validate any external dependencies 204 against the component definitions 122 of the subject sub-system definition 116 as well as with the component definitions 122 of the other sub-system definitions 116.

At step 512, the application 104 stores the sub-system definition 116 along with its respective component definitions 122 in the data source 106. In general, those component definitions 122 stored in the sub-system definition 116 have been validated against the internal dependencies 202. The application 104 may also store information associated with any external dependencies 204 in the metadata portion 132 of the sub-system definition 116. At this point, the sub-system definition 116 has been created and stored in the data source 106 in which the process ends.

Although the process described in steps 502 through 512 provides a single sub-system definition 116 that can be used to create multiple integrated computing system definitions 110, it should be understood that the process described in steps 502 through 512 may be used to create multiple sub-system definitions 116, such as sub-system definitions for each of the compute sub-system, storage sub-system, and network sub-system of a CI as shown and described above with reference to FIGS. 3A and 3B.

Figure 5B:
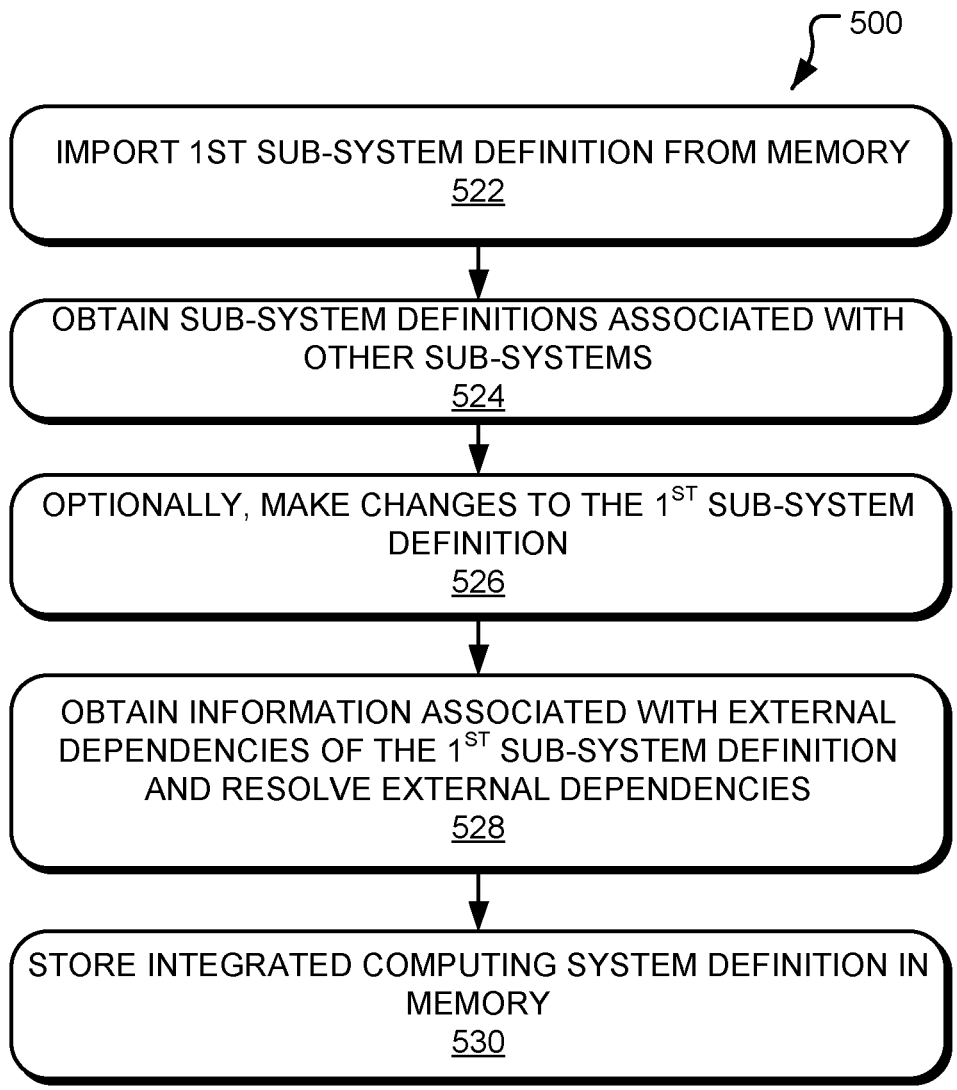
FIG. 5B illustrates an example process that may be performed by the application to create a customized integrated computing system definition from an existing sub-system definition according to one embodiment of the present disclosure.

FIG. 5B illustrates an example process 500 that may be performed by the application 104 to create a customized integrated computing system definition 110 from an existing sub-system definition 116 that has been previously created and stored in a memory, such as the data source 106 of FIG. 1B.

At step 522, the application 104 initially imports a sub-system definition 116 that has been previously created and stored in a memory (e.g., the data source 106). The application 104 may also obtain information for creating other sub-system definitions 116 for another integrated computing system definition 110 at step 524. For example, the application 104 may obtain component definitions 122 via user input for creating one or more other sub-system definitions 116. As another example, the application 104 may receive a request to import one or more other sub-system definitions 116 from the data source 106. That is, the application 104 may obtain a sub-system definitions 116 for a compute sub-system and a storage sub-system that have been previously created and stored in the data source 106, and obtain component definitions 122 for creating a new network sub-system 114.

At step 526, the application 104 may optionally receive user input, via the user interface 108, for modifying one or more of the obtained sub-system definitions 116. For example, a previously created and stored compute sub-system definition 116 may imported because it has at least most of the performance features desired by the user. However, because the user may desire certain additional features (e.g., more processing speed, storage capacity, and/or throughput speed, reduced cost, etc.), the application 104 may be used to add, modify, and/or delete certain component definitions 122 so that the resulting sub-system definition 116 optimally meets its desired performance features.

At step 528, the application 104 resolves any internal dependencies 202 and external dependencies associated with the imported sub-system definition 116 and with the other sub-system definitions 116. In one embodiment, the application 104 may obtain external dependency information stored in the metadata portion 132 of the sub-system definition 116, and using this information, modify one or more components of the subject sub-system definition 116 and/or the other sub-system definitions 116. In some cases, the application 104 may automatically resolve the external dependencies 204 of the sub-system definition 116, or manually by receiving user input for making changes to the component definitions 122 of the subject sub-system definition 116.

When some, most, or all of the internal dependencies 202 and external dependencies of the sub-system definitions 116 have been resolved, the application 104 may then store the sub-system definitions 116 in the memory as a new integrated computing system definition 110, which can be used to fabricate a physical integrated computing system 112.

The process described above can be repeatedly performed to continually modify the components of the sub-system definitions 116 for customizing the new integrated computing system definition 110 according to the user's choice. Nevertheless, when the use of the application 104 is no longer needed or desired, the process ends.

Although the description of FIGS. 5A and 5B describe example processes that may be performed by the application 104 to create a sub-system definition 116 that can be used to create multiple, differing types of integrated computing system definitions 110, the features of the disclosed process may be embodied in other specific forms without deviating from the spirit and scope of the present disclosure. For example, the application 104 may perform additional, fewer, or different steps than those steps as described in the present examples. As another example, certain steps of the process described herein may be performed by other computing devices external to the system 100, such as another computing device that communicates with the computing system 102 using a communication network such as described above.

Figure 6A:
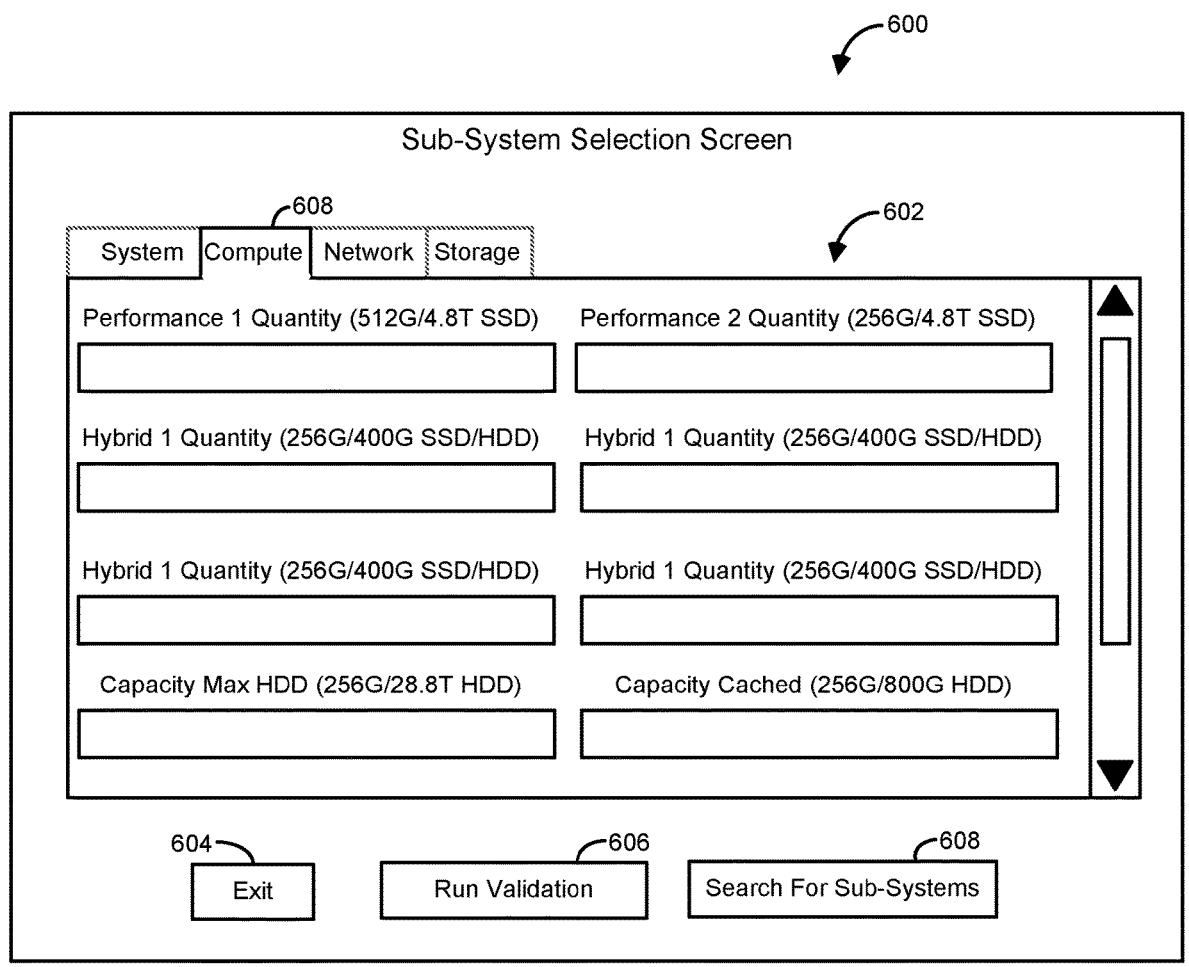
FIGS. 6A through 6D illustrate example screenshots that may be displayed by the application for interacting with the user to receive information for creating a customized sub-system definition that can be subsequently used to create multiple, differing integrated computing system definitions according to one embodiment of the present disclosure.
Figure 6B:
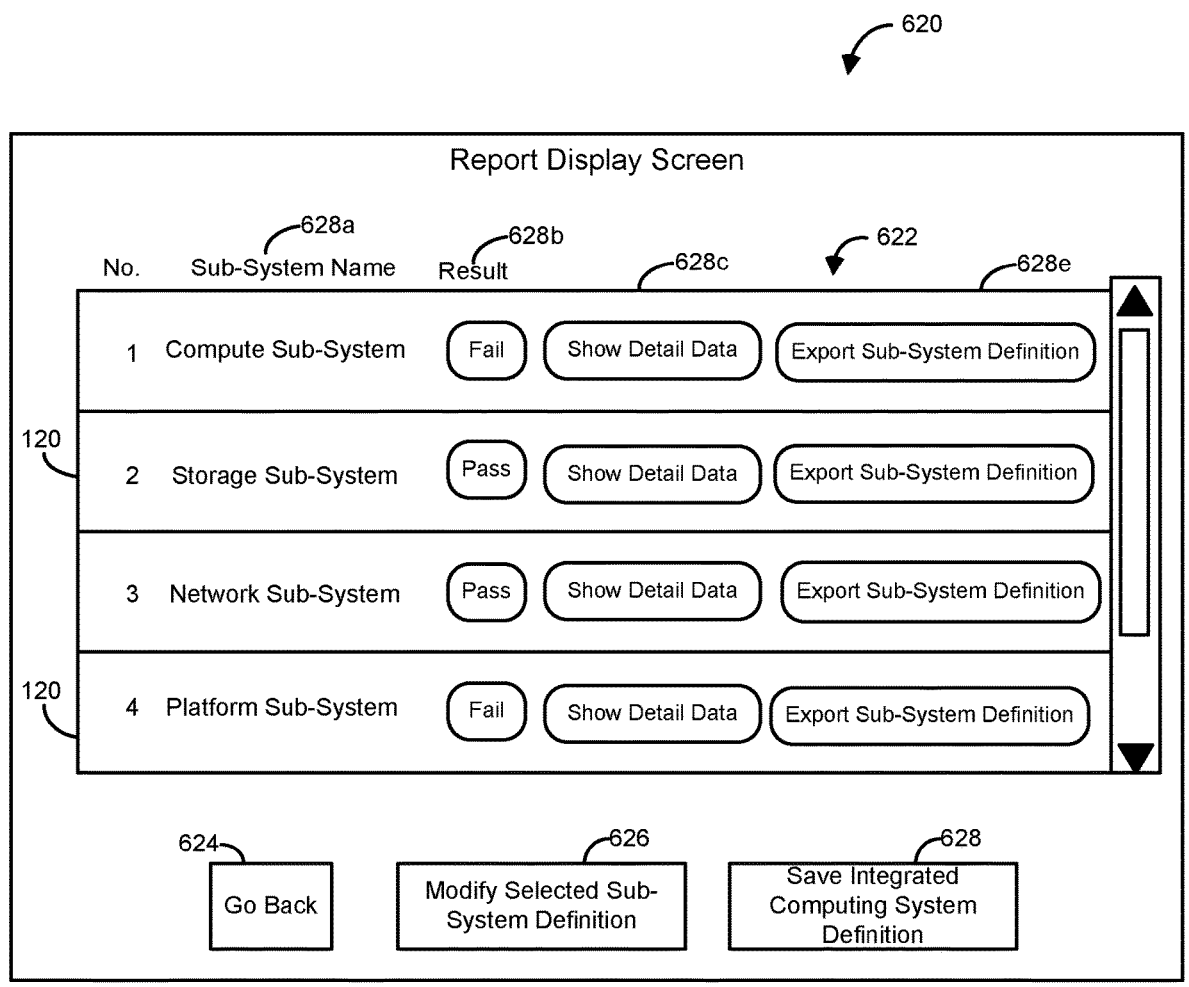
Figure 6C:
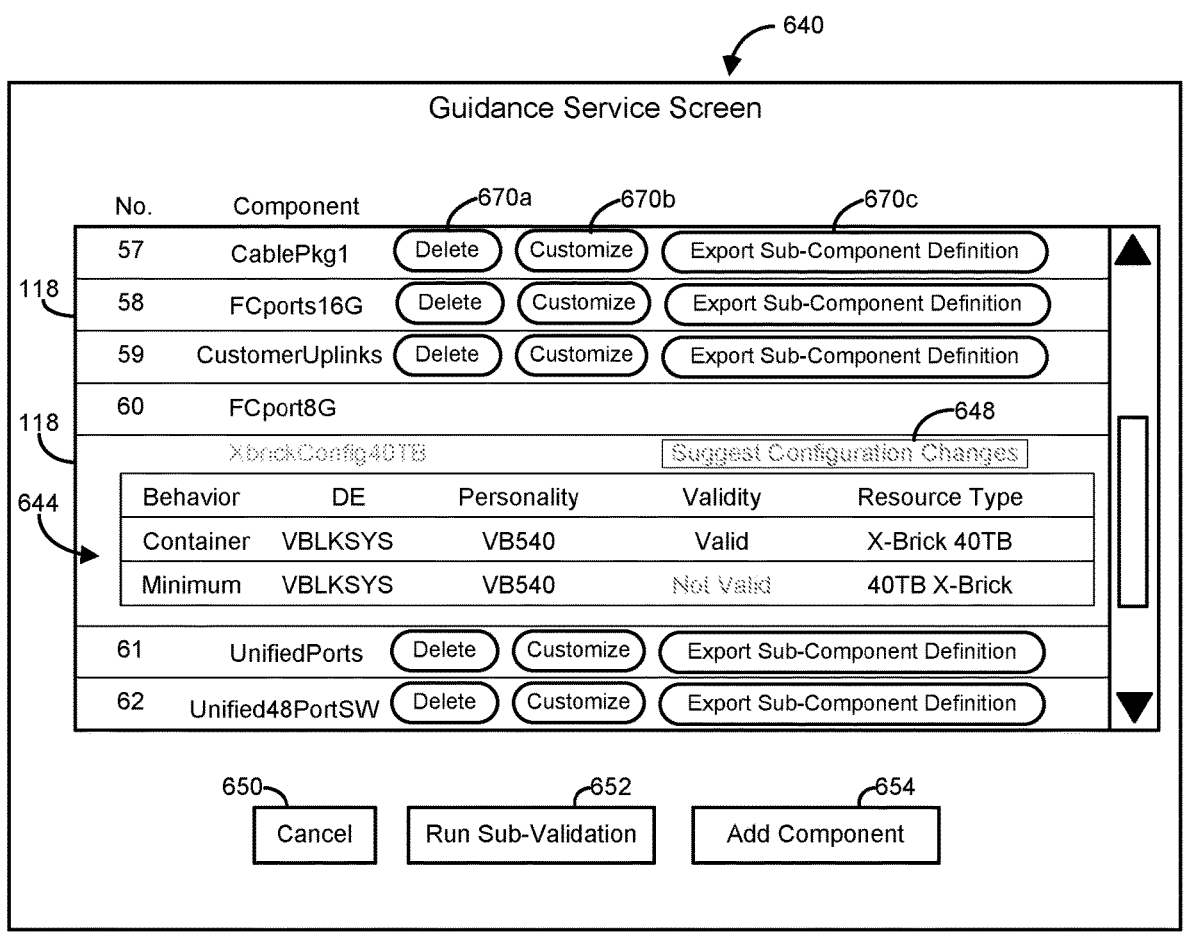
Figure 6D:
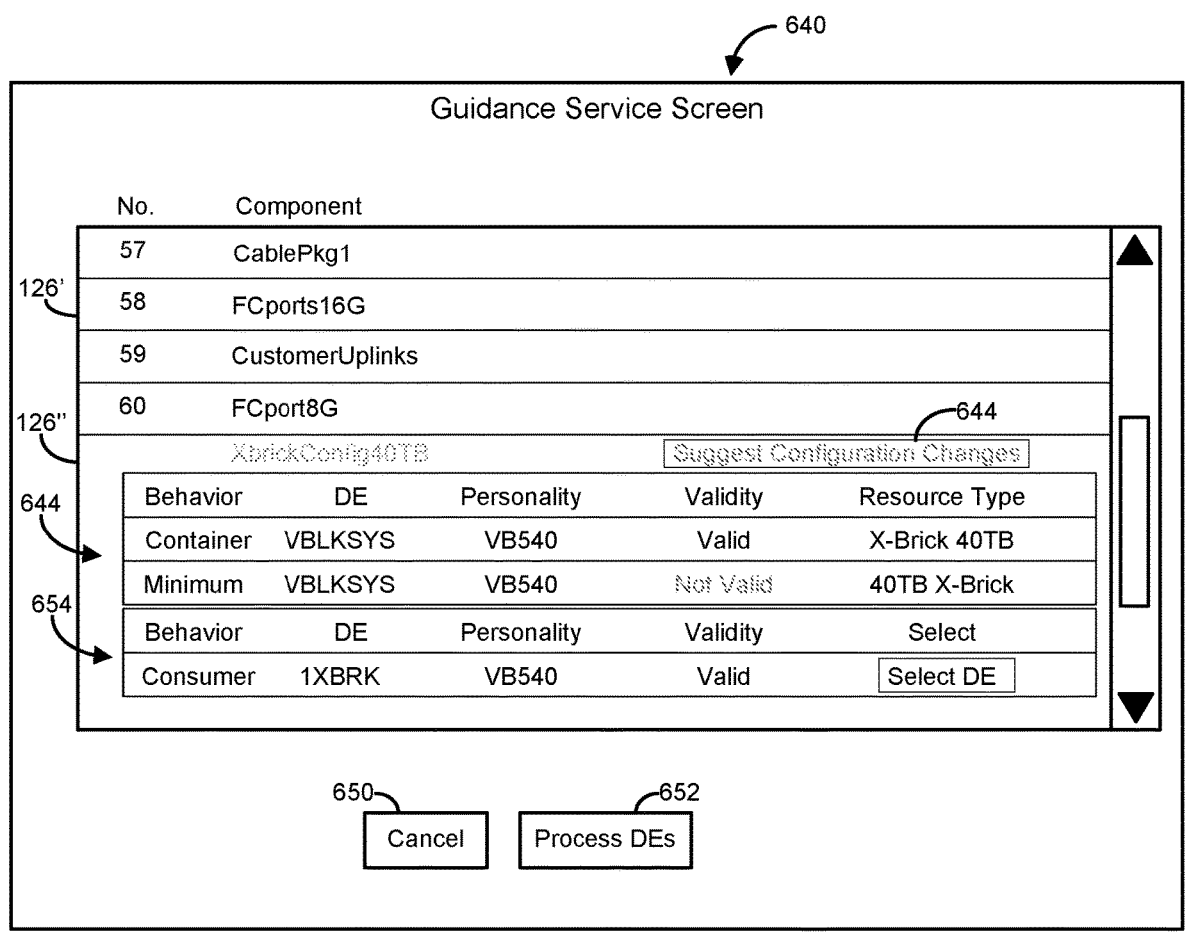

FIGS. 6A through 6D illustrate example screenshots that may be displayed by the application 104 for interacting with the user to receive information for creating a customized sub-system definition that can subsequently be used to create multiple, differing integrated computing system definitions 110 representing corresponding multiple customized integrated computing systems 118 according to one embodiment of the present disclosure. In general, FIG. 6A is a user sub-system selection screen 600 that may be used to receive user input for selecting one or more sub-systems 126, FIG. 6B is a report display screen 620 that may be displayed for displaying the results associated with validating sub-system definitions 116 based upon the sub-system definitions selected via the sub-system selection screen 600, FIG. 6C is a guidance service screen 640 that may be displayed for displaying those sub-systems 126 to be customized by the user, while FIG. 6D illustrates a sub-system suggestion window that may be displayed to receive user input for providing one or more remedial actions to correct the invalid configuration of the customized integrated computing system configuration 116.

Referring initially to FIG. 6A, the user sub-system selection screen 600 includes a tabbed sub-system selection screen 602, a 'cancel' button 604, and a 'run validation' button 606. The tabbed sub-system selection screen 602 provides for user selection of certain sub-systems 126 according to the various sub-systems of an integrated computing system (e.g., generic (system wide) components, compute sub-system, network, sub-system, and storage sub-system, etc.). The tabbed sub-system selection screen 602 includes multiple tabs 608, that when selected by the user, display various previously configured sub-systems associated with its particular sub-system. As shown, the compute sub-system tab 608 has been selected; thus, the application 104 displays multiple compute sub-systems that may be selected by the user for inclusion in the customized integrated computing system configuration 116.

Each sub-system definition 116 generally includes a structured combination of component definitions 122 representing individual components 120 that form the sub-system definition 116. For example, a sub-system definition 116 may be stored as a file or other logical construct (e.g., a database structure) that includes logical constructs of its constituent component definitions 122. Although the present example shows a sub-system selection screen 602 that provides for selection of sub-system definitions 126 representing previously configured sub-systems, it should be understood that the user sub-system selection screen 600 may display sub-system definitions 126 representing single components 120 that may be selected by the user for inclusion in the customized integrated computing system definition 116. For example, once the application 104 receives selection of a sub-system definition 126, it may display one or more other sub-system selection screens for receiving user selection of one or more component definitions 126 representing individual components 120 to be included with the sub-system definition 126, user selection for removal of one or more component definitions representing components 120 to be removed from the sub-system definition 126, and/or user selection for modification of an existing sub-system 126 in the sub-system definition 126.

To use the application 104, the user may arrive at the user sub-system selection screen 600 and enter one or more user selected sub-system definitions 126. The user selected sub-system definitions 126 may be selected from one, some, or all sub-system selection screens 602 available to the user. For example, the user may select one sub-system definition 126 from the compute sub-system selection screen, two sub-system definitions from the storage sub-system selection screen, and two sub-system definitions from the network sub-system selection screen. When selection of all desired user selected sub-system definitions 126 have been entered by the user, the 'run validation' button 606 may be selected by the user. In essence, selection of the 'run validation' button 606 instructs the application 104 to validate each component definition in each of the selected sub-system definitions 116 to resolve any internal and/or external dependencies of those component definitions 122. Upon completion of the validation process, the application 104 may then display the report display screen 620 as shown in FIG. 6B.

Referring now to FIG. 6B, the report display screen 620 includes a table 622, a 'go back' button 624, a 'modify selected sub-system' button 626. The table 622 is included to display the sub-system definitions as a list in which each selected sub-system definition 116 occupies a row of the table 622, while validation information associated with each sub-system definition is arranged in columns. For example, the columns may include a 'sub-system name' column 628a, a 'validation result' column 628b, a 'show detail data' column 628c, and an 'export sub-system definition' column 628d. The 'sub-system name' column 628a displays the name of the sub-system def. The 'validation result' column 628b indicates whether its respective sub-system definition may form a valid configuration given the sub-system definitions 126 selected by the user.

The 'show detail data' column 628c includes selectable buttons for each sub-system definition that when selected by the user, displays detailed information about particular conditions that were, or were not, properly met to form a valid configuration. For example, when the application 104 receives selection of the 'show detail data' button, it may display one or more internal dependencies 202 and/or one or more external dependencies 204 that were not properly validated.

The 'export sub-system definition column 628*d* includes selectable buttons for each sub-system definition 116 that when selected by the user, instructs the application 104 to save that sub-system definition in the memory 302. The customized integrated computing system configuration 116 may be saved in any suitable format. In one embodiment, the customized sub-system definition 116 may be saved in table form, such as in a spreadsheet format that may be accessed using any commonly available spreadsheet display tool.

The 'save integrated computing system definition button column 628*e* includes a selectable button that when selected by the user, instructs the application 104 to generate a new integrated computing system definition 110 that can be used for fabricated a customized integrated computing system configuration 116 according to the components selected for each sub-system definition 116.

Such a system may be useful for continual adaptation of the integrated computing system definitions 110 according to ever-changing technological advancements in the components that make up a integrated computing system. For example, a certain integrated computing system definition 110, which has been configured to use certain components that are based upon a previous technology that has now been obsoleted or rather superseded by a new technology, may be updated to use the newer technology by customizing that integrated computing system definition 120 to use the newer technology and creating a new integrated computing system definition 110 by selecting the 'save integrated computing system definition button so that ensuing customization may be performed using the newly created integrated computing system template 120 that has been customized to include the new technology.

The 'modify selected sub-system definition button 626 may be provided to modify a sub-system definition 116 which has been selected by the user via the table 622. For example, the user may access the details, using the 'show detail data' button 628*c* of a particular sub-system definition that failed validation, identify why that sub-system definition 116 failed validation, and select the 'modify selected sub-system definition button 626 to modify the component definitions 122 of that sub-system definition to correct the failed condition. The aforedescribed process may be iteratively conducted multiple times until a desired integrated computing system definition 110 may be validated using the combination of sub-system definitions 126 selected by the user.

When actuation of the 'modify sub-system definition button 626 is received by the application 104, it may display the guidance service screen 640 as shown in FIG. 6C. The guidance service screen 640 displays the component definitions 122 of the sub-system definition 116 as a list 642 with rows in which each row is populated with one component definition 118 of the customized sub-system definition 116. The component definitions 118' that were properly validated may be displayed in a different manner from those component definitions 118" that were not validated (e.g., their internal and/or external dependencies were not resolved) by displaying the properly validated sub-systems 126 in a color (e.g., blue) that is different from the color (e.g., red) from the non-validated component definitions 118. Nevertheless, any suitable visual or audible mechanism may be used to delineate the validated component definitions 126' from those other component definitions 122" that were not validated.

For those component definitions 122" that were not validated, the application may display a personality display screen 644 that displays a list having rows populated with one or more of the characteristics of the component definition 118" that was not validated. In this manner, the user may be notified of which particular characteristic of the component 120" that caused it to be not validated. Additionally, for those component definitions 122" that were not validated, a 'suggest configuration changes' button 648 may be displayed for prompting user input for receiving a remedial action to be applied to the customized component definition 116. When the 'suggest configuration changes' button 648 is selected by the user, the application may display the guidance service screen 650 as shown in FIG. 6D.

Referring now to FIG. 6D, when the 'suggest configuration changes' button 648 is selected, the application 104 displays a suggestion window 654 for receiving selection of one of multiple optional remedial actions to be taken that when applied to the customized integrated computing system configuration 116, may cause the non-validated component definition 118" to become validated. In the example guidance service screen 640 as shown, 2 alternative remedial actions may be taken, a first remedial action includes an addition of a sub-system 126 that functions as a container to be used for supporting the operation of the sub-system 126", while a second remedial action involves removal of that sub-system 126" from the customized integrated computing system configuration 116. Although only two types of remedial actions are shown in the present example, any suitable type of remedial action may be displayed that when applied to the customized integrated computing system configuration 116, causes the sub-system 126" to become validated. For example, one remedial action may include an addition of one or more other sub-systems 126, removal of one or more existing sub-systems 126, or modification of one or more existing sub-systems in the customized integrated computing system configuration 116.

The guidance service screen 640 also displays a 'go back' button 650 that when selected by the user, causes the application 104 to exit the guidance service screen 640, a 'run sub-validation' button 652, and an 'add component' button 654. Additionally, certain rows may include a 'delete' button 670*a*, a 'customize' button 670*b*, and an 'export sub-component' button 670*c* that may provide a means to customize its sub-component definitions 122, and export the customized component definition 118 for use with other sub-system definitions 116. The 'customize' button 670*b*, the 'add component' button 654, and 'export sub-component' button 670*c* provide a means to customize the sub-system definition 116 as well as certain component definitions 122 that are included in the sub-system definition 116. For example, one or more component definitions 122 may be added to the sub-system definition 116 by selecting the 'add component' button, an existing component definition 118 may be deleted by selecting the 'delete' button 670*a* associated with that component definition 118, while one or more of the component definitions 122 may be customized by selecting the 'customize' button 670*b* associated with that component definition 118.

Although FIGS. 6A through 6D illustrate example screens that may be used for receiving user input for generating a customized integrated computing system configuration 116 using user selection of certain sub-systems 126, the application 104 may display additional, fewer, or different screens or information included in those screens without departing from the spirit and scope of the present disclosure. For example, the application 104 may display other screens for displaying details of user selected sub-systems 126 entered by the user, or receiving entry of other information for forming the customized integrated computing system definition 110 from which an integrated computing system definition 116 may be fabricated.

In one embodiment, the application 104 may provide an interactive graphical interface that displays combinations of sub-system definitions 116s as a multi-dimensional display structure in which each dimension of the structure is associated with a certain criteria. Additionally, each sub-system definition 116 may be classified according to more than one criteria such that the multi-dimensional display structure may be formed that can be viewed and edited in a manner that alleviates time consuming searches akin to 'looking for a needle in a haystack'.

In general, due to the high level of variability in the configuration of most integrated computing systems, validation can be a cumbersome affair. Sub-system definitions 116 can provide a time-wise efficient technique for manipulating and publishing multiple sub-system definitions 116 that can be mixed and matched to provide integrated computing systems 112 with a high level of customizability. Nevertheless, this technique may also result in large quantities of sub-system definitions 116 that may difficult to manage.

Embodiments of the present disclosure may provide a solution to this problem, in addition to other problems, by categorizing each sub-system definition 116 according to one or more criteria, and organizing those sub-system definitions 116 into a single multi-dimensional display structure that can be displayed on a graphical user interface. Using this approach, integrated computing system designers may be able to efficiently narrow their search for sub-system definitions 116 using certain criteria believed to be important to their resulting integrated computing system 112 configuration. Additionally, new sub-system definitions 116 may be added to the multi-dimensional display structure by obtaining a particular sub-system definition 116 from the structure, performing one or more modifications to the selected sub-system definition 116 to further customize its configuration, and submitting the modified sub-system definition 116 as a new sub-system definition 116 back into the structure for future use. Thus, the multi-dimensional display structure may be expanded each time a new customized integrated computing system is designed in a manner that may mitigate unnecessary doubling of effort (e.g., reinventing the wheel).

Many users approach integrated computing system customization with certain criteria expected for each sub-system of a resulting customized CI. Embodiments of the present disclosure may build upon this paradigm by providing a multi-dimensional display structure in which those sub-systems that meet those criteria can be quickly and easily identified from among numerous available sub-system definitions 116. For example, an integrated computing system designer wants to obtain a sub-system definition 116 for a storage sub-system having greater than 1000 Terabytes of storage, is structured as a unified storage system, and costs less than a certain amount (e.g., less than $500). When these criteria are entered into the application 104, it will identify those sub-system definitions 116 that meet those criteria and display any filtered sub-system definitions 116 as a multi-dimensional table (e.g., a first criteria arranged in rows, a second criteria arranged in columns, and a third criteria arranged as one or more tiered multi-dimensional tables). Thus, the integrated computing system designer may efficiently view relatively large numbers of sub-system definitions 116 in a structured, easy to view and navigate manner that optimally provides the desired criteria sought for in each sub-system of the resulting integrated computing system configuration.

Figure 7:
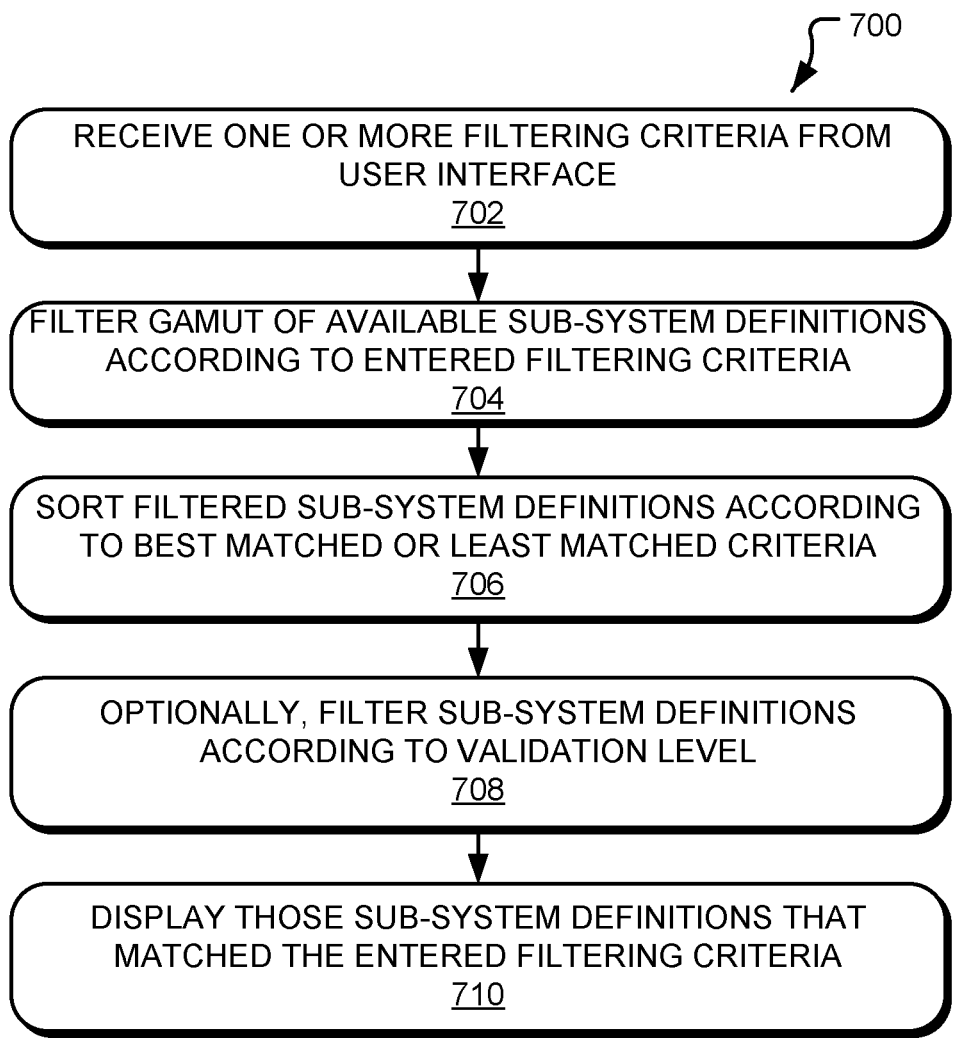
FIG. 7 illustrates an example process that may be performed by the application to search for and filter the available sub-system definitions stored in the data source according to one or more criteria according to one embodiment of the present disclosure.

FIG. 7 illustrates an example process 700 that may be performed by the application 104 to search for and filter the available sub-system definitions 116 stored in the data source 106 according to one or more criteria according to one embodiment of the present disclosure. Initially, at step 702, the application 104 may receive one or more filtering criteria from the user interface 108. The filtering criteria may be any type that can be used to filter at least one of the sub-system definitions 116 from among the other sub-system definitions 116 stored in the data source 106. Examples, of such criteria may include a valid cumulative date range of constituent components, a cost range, a performance, power/cooling requirements, compliance, regulatory constraints, the customer for whom the integrated computing system is being designed, type of storage array (e.g., unified storage array or non-unified storage array, etc.), and the like.

At step 704, the application 104 may then filter the gamut of available sub-system definitions 116 according to the filtering criteria. Thereafter, the application 104 may sort the filtered sub-system definitions 116 according to a best matched or least matched criteria. That is, the filtered sub-system definitions 116 may be arranged in either or all of the rows, columns, and/or tiered tables of the multi-dimensional display structure according to those sub-system definitions 116 that most closely matched the filtering criteria or according to those sub-system definitions 116 that matched the filtering criteria to the least degree.

At step 708, the application 104 may filter the sub-system definitions 116 according to their validation level when arranged with certain other sub-system definitions 116 in an integrated computing system definition 110 being customized. That is, the application 104 may sequentially process each filtered sub-system definition 116 to determine if any, and if so, how many external dependencies 204 to the sub-system definition 116 are unresolved with other sub-system definitions 116 exist in the integrated computing system definition 110, and calculate a validation level indicative of a validation level of that sub-system definition 116. The validation level may be calculated in any suitable manner. For example, the validation level may be calculated by dividing the total quantity of unresolved dependencies with a total quantity of component definitions 118 included in the sub-system definition 116. Additionally, the filtered sub-system definitions 116 may be sorted according to their calculated validation level indices so that integrated computing system designers may be able to select a particular sub-system definition 116 that requires relatively little dependency resolution for its configuration in the integrated computing system definition 110.

At step 710, the application 104 may then display the multi-dimensional display structure for view by the user. In one embodiment, the application 104 may also enable selection for one of the sub-system definitions 116 to be included in the integrated computing system definition 110 by the user.

The process described above can be performed repeatedly to search for, and select sub-system definitions 116 to be included in the integrated computing system definition 110 or another integrated computing system definition 110 of the user's choosing. Nevertheless, when the use of the application 104 is no longer needed or desired, the process ends.

Although FIG. 7 describes an example process that may be performed by the application 104 to search for, and select a sub-system definition 116 from among multiple, available sub-system definitions 116, the features of the disclosed process may be embodied in other specific forms without deviating from the spirit and scope of the present disclosure. For example, the application 104 may perform additional, fewer, or different steps than those steps as described in the present examples. As another example, certain steps of the process described herein may be performed by other computing devices external to the system 100, such as another computing device that communicates with the computing system 102 using a communication network such as described above.

Figure 8A:
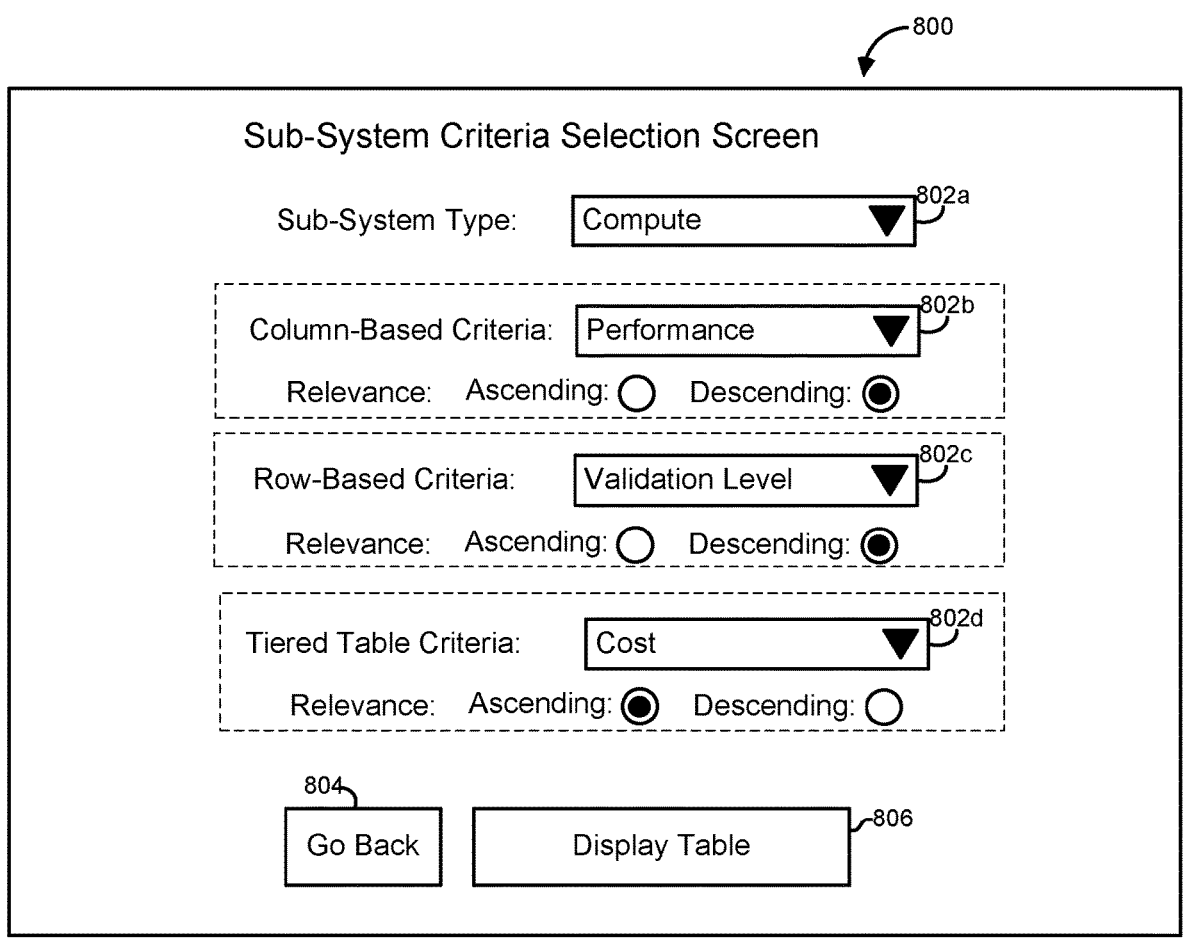
FIGS. 8A and 8B illustrate example screenshots that may be displayed by the application for interacting with the user to receive information for generating a multi-dimensional display structure according to one embodiment of the present disclosure.
Figure 8B:
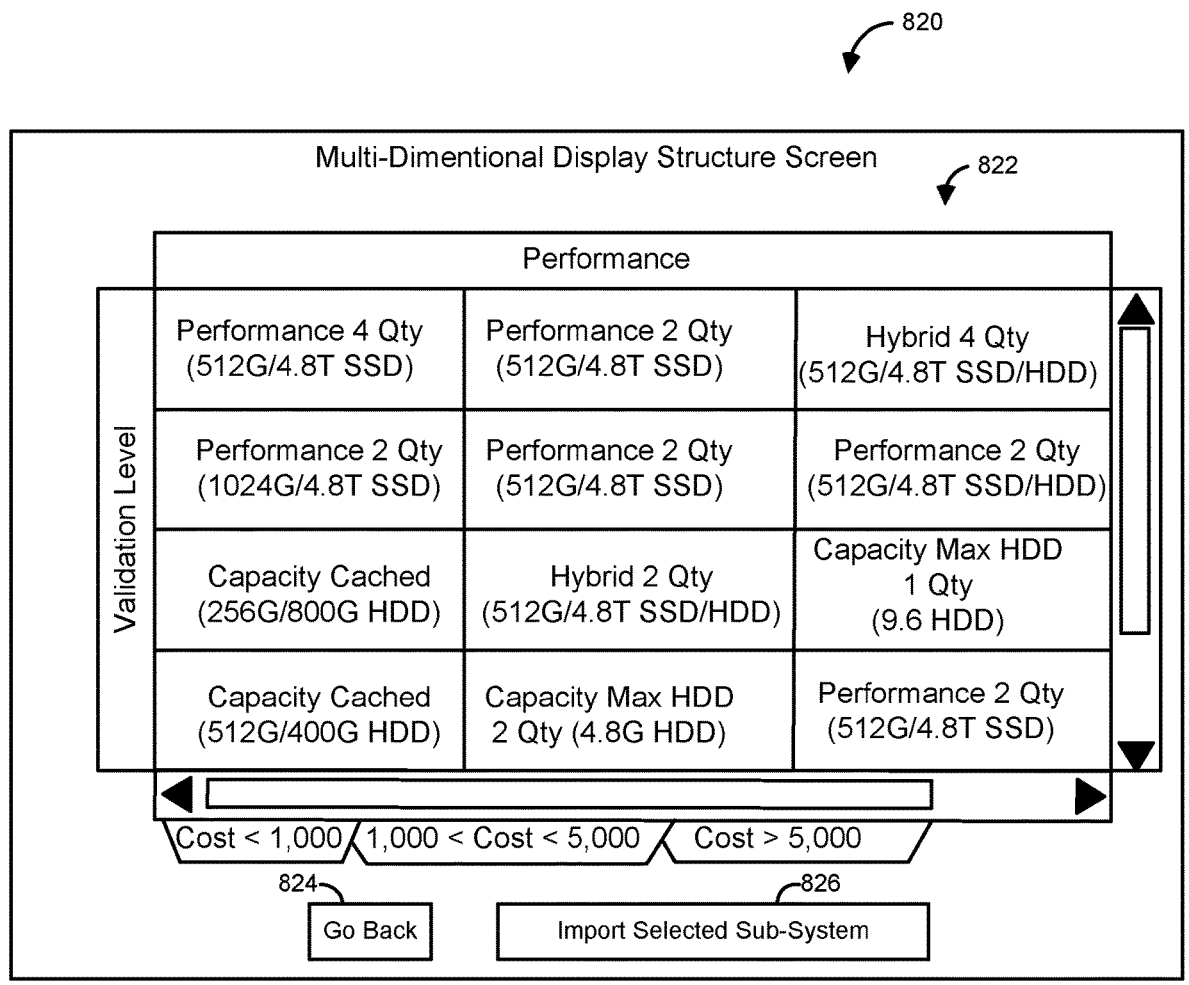

FIGS. 8A through 8B illustrate example screenshots that may be displayed by the application 104 for interacting with the user to receive information for generating a multi-dimensional display structure that displays filtered sub-system definitions 116 according to one or more criteria as specified by the user. In general, FIG. 8A illustrates a sub-system criteria selection screen 802 for receiving criteria information from the user, while FIG. 8B illustrates a multi-dimensional display structure display screen 830 that displays the multi-dimensional display structure and also receives selection for one of the sub-system definitions 116 shown in the multi-dimensional display structure for inclusion in an integrated computing system definition 110 being designed by the user.

Referring initially to FIG. 8A, the sub-system criteria selection screen 800 includes several drop-down boxes 802. In particular, the sub-system criteria selection screen 800 includes a sub-system type drop-down box 802a, a Column-based criteria drop-down box 802b, a Row-based criteria drop-down box 802c, and a tiered table criteria drop-down box 802d. When each of the drop-down boxes 802 are selected, the application 104 expands that drop-down box 802 to include one or more optional parameters that can be selected by the user. For example, when the user selects the drop-down box 802a, the drop-down box 802a may be expanded to show several selectable button indicating available sub-system types, such as a compute sub-system, a storage sub-system, a network sub-system, and a platform sub-system. From this point, the application 104 may receive selection of one of the sub-system types to indicate to the application 104 what type of sub-system is requested to be searched for by the user. As shown in the example sub-system criteria selection screen 800, the compute sub-system has been selected for the sub-system type drop-down box 802a. In a similar manner for the Column-based drop-down box 802b, the Row-based criteria drop-down box 802c, and the tiered table criteria drop-down box 802d, the application 104 may receive user selection of criteria to be used for filtering the available sub-system definitions 116 according to the Column-based of the multi-dimensional display structure, the Row-based of the multi-dimensional display structure, and the tiered tables of the multi-dimensional display structure.

The sub-system criteria selection screen 800 also includes a 'go back' button 804 and a 'display table' button 806. When the 'Go Back' button 804 is selected by the user, the application 104 may revert back to another screen from which the sub-system criteria selection screen 800 was arrived at, such as the sub-system selection screen 600 as shown and described above with reference to FIG. 6A. However, when the 'Display Table' button 804 is selected by the user, the application 104 may display the multi-dimensional display structure display screen 820 as shown in FIG. 8B.

Referring now to FIG. 8B, the multi-dimensional display structure display screen 820 includes a tiered table 822, a 'go back' button 824, and an 'import selected sub-system' button 826. The table 822 is included to display the sub-system definitions 116 are arranged in rows, columns, and one or more tiered tables according to the criteria entered in the sub-system criteria selection screen 800. For example, the sub-system definitions 116 as shown in FIG. 8B are arranged in rows according to their relevance to a validation level as specified in the sub-system criteria selection screen 800, in columns according to their relevance to a performance level as specified in the sub-system criteria selection screen 800, and according to their relative cost as specified in the sub-system criteria selection screen 800.

It should be understood, nevertheless, that the sub-system definitions 116 may be arranged according to any suitable criteria entered by the user. Additionally, the application 104 may be configured to filter and display the sub-system definitions 116 when only one or two criteria dimensions are entered by the user. For example, when 'Display Table' button 804 is selected by the user and only one criteria dimension is entered by the user (e.g., a validation level criteria is entered for the row-based dimension), the application 104 may search through the available sub-system definitions 116 stored in the data source 106 and display in ascending or descending order, the sub-system definitions 116 according to their validation level along the rows of the multi-dimensional display structure. Also, although a multi-dimensional display structure is shown having three dimensions, it should be understood that the multi-dimensional display structure may have any number of dimensions without departing from the spirit and scope of the present disclosure. For example, the multi-dimensional display structure may have only one criteria dimension, two criteria dimensions, or four or more criteria dimensions.

User selection of a sub-system definition 116 may be provided by the 'Import Selected sub-system' button 826. For example, the application 104 may receive selection of a particular sub-system definition 116 from among the multiple sub-system definitions 116 displayed in the multi-dimensional display structure, such as using a mouse-click over the desired sub-system definition 116 or other suitable selection technique, and when the 'Import Selected sub-system' button 804 is selected, retrieve the sub-system definition 116 from the data source 106 and include that sub-system definition 116 with the integrated computing system definition 110 being customized by the user. For example, upon selection of the 'Import Selected sub-system' button 804, the application 104 may revert to display of the Sub-System Selection Screen 600 as shown in FIG. 6A.

Although FIGS. 8A and 8B illustrate example screens that may be used for receiving user input for searching the available sub-system definitions 116 according to one or more criteria, the application 104 may display additional, fewer, or different screens or information included in those screens without departing from the spirit and scope of the present disclosure. For example, the application 104 may display other screens for displaying details of other types of criteria to be applied to the search by the application 104.

In one embodiment, the application 104 may organize customized integrated computing system definitions 110 in workgroups that include one or more integrated computing system definitions 110 and generate a report that may be useful for comparing the integrated computing system definitions 110 against one another. Such a feature may be useful for users of the application 104 to generate multiple integrated computing system definitions 110 that are related to one another, yet differ slightly so that users can identify how changes to an integrated computing system may be affected by those differences. Additionally, the multiple integrated computing system definitions 110 may be stored in workgroups so that the related integrated computing system definitions 110 may be organized in a convenient easily searchable format. One particular feature that may be provided may include adding potential upgrade scenarios to a baseline integrated computing system definition 110 generated by the system 100. For example, once an integrated computing system definition 110 is generated, such as for a customer who is considering the purchase of an integrated computing system, one or more additional upgrade integrated computing system definitions 110 may be generated to show how the integrated computing system may be upgraded in the future to meet anticipated increased performance needs, and an expected cost for such future upgrades.

Due to the high level of variability in the configuration of most integrated computing systems, validation can be a cumbersome affair. Users often want to maximize performance of these integrated computing systems while limiting their monetary outlay (e.g., cost). Nevertheless, maximizing performance at the lowest possible cost often yields an integrated computing system configuration that may not be expandable to meet future needs for the user. Thus integrated computing system designers are faced with a myriad of configuration options to meet performance, cost, as well as future expandability goals, which can be a very complex and time consuming endeavor. Embodiments of the present disclosure may provide a solution to this problem by providing workgroups in which multiple related integrated computing system definitions 110 may be stored, and which may be displayed as a report in a manner that allows the user to quickly identify how certain changes made to a baseline integrated computing system configuration may affect certain characteristics of each differing integrated computing system configuration stored in the workgroup 130.

In general, sub-system definitions 116 may be generated that are portable in that they can be used for validation of a first integrated computing system definition 110 associated with a first integrated computing system 112. These sub-system definitions 116 may also be used to generate one or more additional integrated computing system definitions 110 to estimate future growth upgrade potential for a resulting integrated computing system 112 to be constructed according to the first overall global model. Moreover, these additional integrated computing system definitions 110 may be generated in a structured organized manner that provide integrated computing system designers with insight into how certain upgraded configurations may be most beneficial relative to other upgraded configurations in an efficient manner. Additionally, customer satisfaction may be enhanced by making the user aware of how variations in their initial cost outlay may affect future upgrade potential for their new purchase.

Figure 9:
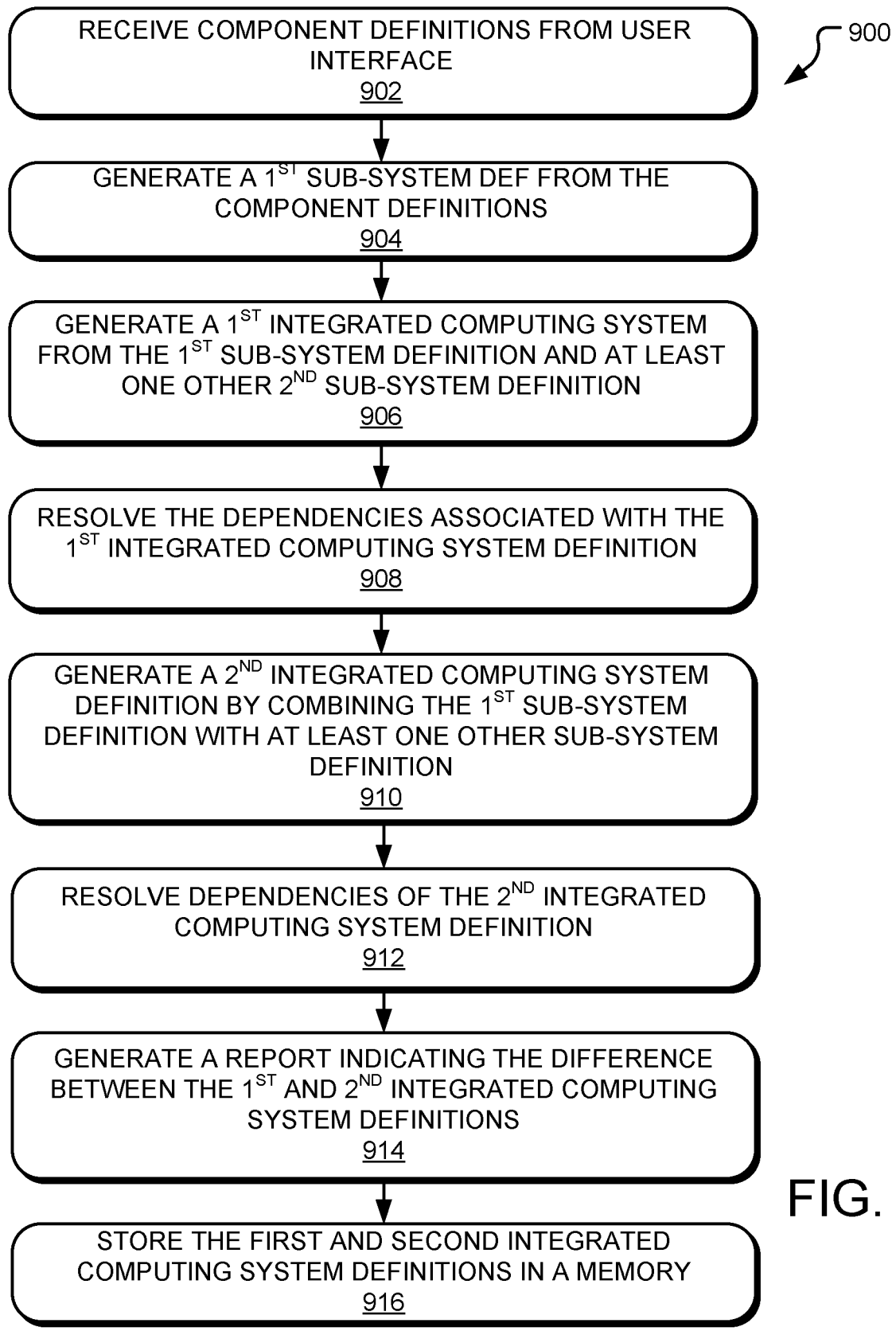
FIG. 9 illustrates an example process that may be performed by the application to generate multiple integrated computing system definitions from which a report can be generated to show relative features of each integrated computing system definition relative to one another according to one embodiment of the present disclosure.

FIG. 9 illustrates an example process 900 that may be performed by the application 104 to generate multiple integrated computing system definitions 110 from which a report can be generated to show relative features of each integrated computing system definition 110 relative to one another. Initially, the process 900 may be arrived at when the application 104 receives selection of the 'Save Integrated Computing System Definition' button 628 of the report display screen 620 of FIG. 6B.

In step 902, the application 104 receives, via the user interface 108, selection of one or more user selected component definitions 126 to be included in a first sub-system definition 116. The component definitions 126 may include any type and at any desired level of hierarchy in the corpus (e.g., gamut) of available component definitions 126. For example, the application 104 may receive user selection of a top level component definition 126 and/or one or more sub-component definitions 122 representing one or more sub-components 120 of a component 120.

At step 904, when user selection of user supplied component definitions 126 have been obtained, the application 104 generates a first sub-system definition 116. For example, the application 104 may perform a validation process to determine whether all internal dependencies 202 are resolved, and store external dependency information in the metadata portion of the integrated computing system definition 110 for resolution of those external dependencies when a complete integrated computing system definition 110 is to be validated by the application 104. Thereafter at step 906, the application 104 generates a first integrated computing system definition 110 using the first sub-system definition 116 and one or more other second sub-system definitions 116. For example, if the first sub-system definition 116 includes a storage sub-system definition 116, the one or more other sub-system definitions 116 may include a compute sub-system definition 116, a network sub-system definition 116, and/or a platform sub-system definition 116.

At step 908, the application 104 resolves any internal dependencies 202 and external dependencies 204 associated with the first integrated computing system definition 110. For example, the application 104 may perform a validation process to determine whether all internal dependencies 202 are resolved; and thereafter, resolve the external dependencies 204 to form a validated integrated computing system definition 110.

At step 910, the application 104 generates a second integrated computing system definition 110 using the first sub-system definition 116 and one or more other second sub-system definitions 116. For example, the application 104 may combine the first sub-system definition 116 comprising a compute sub-system definition 116 with a second sub-system definition 116 comprising a unified storage sub-system definition 116 to generate the first integrated computing system definition 110, and combine the compute sub-system definition 116 with another second sub-system definition 116 comprising a non-unified storage sub-system definition 116 to generate the second integrated computing system definition 110. Thus, the user may be able to determine various characteristic changes have resulted due to a first integrated computing system definition 110 comprising a unified storage sub-system definition 116 versus a second integrated computing system definition 110 comprising a non-unified sub-system definition 116.

At step 912, the application 104 resolves any internal dependencies 202 and external dependencies 204 associated with the second integrated computing system definition 110 to form a validated second integrated computing system definition 110. Thereafter at step 914, the application 104 generates a report indicating the difference between the first and second integrated computing system definitions 110. The report may be generated in any suitable manner. In one embodiment, the report may be generated as an ordered list that describes certain attributes of each integrated computing system definition 110, such as freeform text information indicating particular component definitions 118 and/or configuration option that were applied to each integrated computing system definition 110, an estimated cost for each integrated computing system definition 110, and the like. Thereafter at step 914, the application 104 stores the first and second integrated computing system definitions 110 in a memory, such as the data source 106, for access at a later time.

Although the process described in steps 902 through 914 generates multiple integrated computing system definitions 110 from which a report can be generated to show relative features of each integrated computing system definition 110 relative to one another, the features of the disclosed process may be embodied in other specific forms without deviating from the spirit and scope of the present disclosure. For example, the application 104 may perform additional, fewer, or different steps than those steps as described in the present examples. As another example, the step of storing the first and second integrated computing system definitions 110 in a memory may be omitted if access at a later time is not needed or desired. Additionally, the second integrated computing system definition 110 may be generated by modifying or changing only one or a few component definitions 118 included in the first integrated computing system definition 110; that is, it may not be necessary to change one or more sub-system definitions 116 of the first integrated computing system definition 110 to generate a second integrated computing system definition 110 that is different from the first integrated computing system definition 110.

Figure 10A:
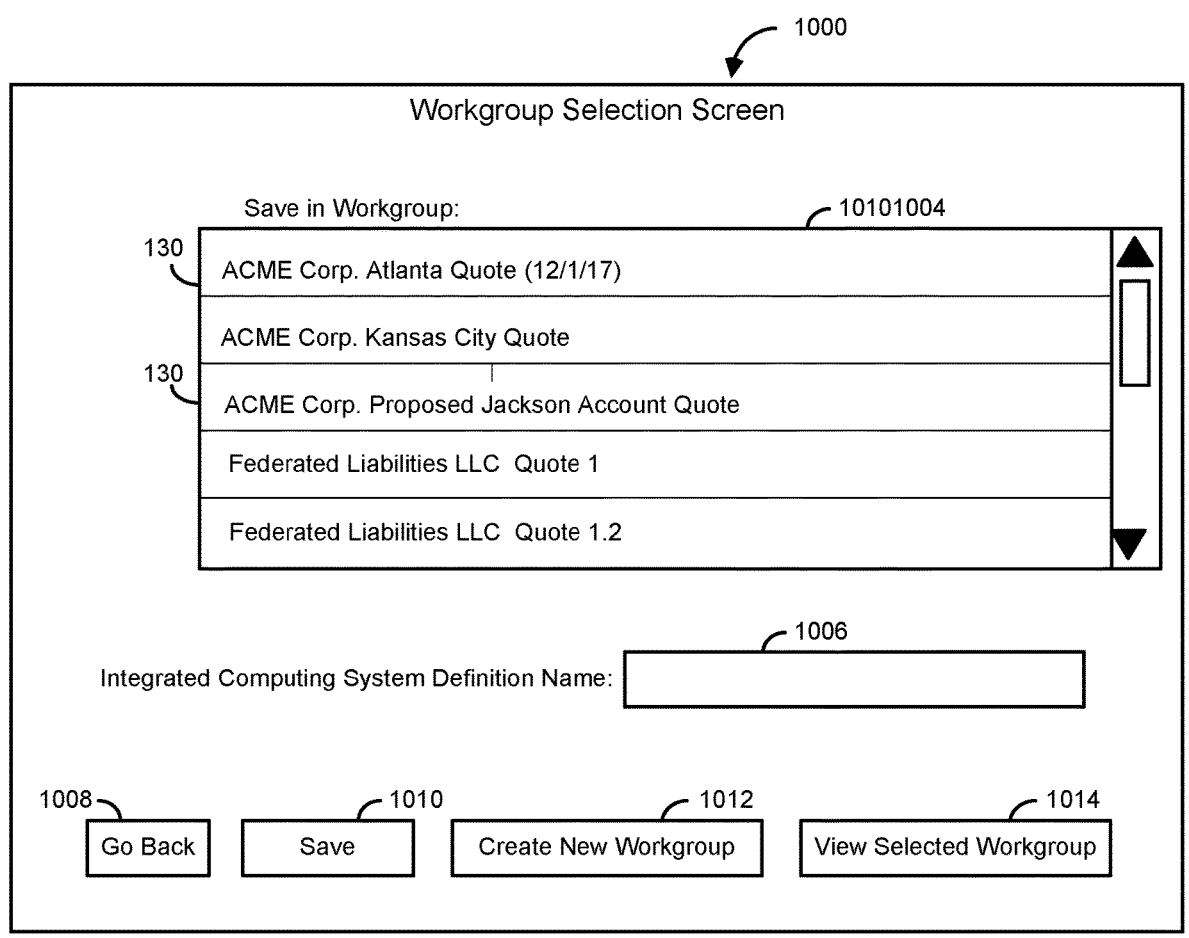

FIGS. 10A through 10B illustrate example screenshots that may be displayed by the application 104 for interacting with the user to receive information for generating multiple integrated computing system definitions 110 and storing the generated integrated computing system definitions 110 in a manner that provides for their efficient, organized storage and retrieval. In general, FIG. 10A illustrates a workgroup selection screen 1000 for receiving selection of a workgroup 130 and/or creation of a new workgroup 130 from the user, while FIG. 10B illustrates a workgroup display screen 1020 that displays a report associated with one or more integrated computing system definitions 110 stored in a particular workgroup 130.

Referring initially to FIG. 10A, the workgroup selection screen 1000 includes a list window 1004 that displays a list of existing workgroups 1002 stored in the data source 106. The workgroup selection screen 1002 may be arrived at as a result of selection of the 'save integrated computing system definition' button 622 as shown and described above with reference to FIG. 6B.

In particular, each workgroup 130 may be individually generated by a user when a customized integrated computing system is to be designed with one or more optional configurations. For example, a workgroup 130 may be created for a particular customer of a customized integrated computing system provider in which several alternative integrated computing system configurations may be solicited for a potential sale. That is, the provider may generate several alternative integrated computing system configurations and provide the resulting workgroup 130 as a quote in which each integrated computing system definition 110 may be displayed with one or more differentiated characteristics.

The workgroup selection screen 1000 also includes an integrated computing system definition name field 1006, a go back button 1008, a save button 1010, a create new workgroup button 1012, and a view selected workgroup button 1014. The integrated computing system definition name field 1006 provides an editable field for entry of a user-selected name for the integrated computing system definition 110 to be stored in a workgroup 130. The go back button 1008, when selected, causes the application 104 to revert back to the previous screen, such as the report display screen 620 of FIG. 6B. Selection of the create new workgroup button 1012 instructs the application 104 to generate a new workgroup 130 to be included in the ordered list window 1004. The view selected workgroup button 1014, when selected, causes the application 104 to generate the workgroup display screen 1020 as shown in FIG. 10B.

Referring now to FIG. 10B, the workgroup display screen 1020 includes an ordered list window 1022 that displays the integrated computing system definitions 110 stored in the displayed workgroup 130. The ordered list window 1022 may also include one or more columns 1024 that provide certain types of information for each integrated computing system definition 110. For example, the ordered list window 1022 includes an integrated computing system definition name column 1024a, a long form description field 1024b, and a cost column 1024c. The integrated computing system definition name column 1024a displays the name of its respective integrated computing system definition 110, such as the name entered into the integrated computing system definition name field 1006 of the workgroup selection screen 1000 of FIG. 10A. The long form description column 1024b is an editable field that allow the user to enter free-form text information to be associated with each integrated computing system definition 110. For example, the long form description column 1024b may be edited by the user to briefly describe certain changes that were made to a base integrated computing system definition 110 to become the alternative integrated computing system definition 110. The cost column 1024c includes an estimated cost to be associated with its respective integrated computing system definition 110. In one embodiment, once each integrated computing system definition 110 is validated by the application 104, it may generate a cost for the integrated computing system definition 110 by obtaining an estimated cost for the component of each constituent component definition 118 and sum the estimated costs to derive the estimated cost for the overall integrated computing system definition 110. In some cases, the application 104 may also factor in other cost aspects to further refine the estimated cost, such as determining an estimated shipping and handling fee for delivery of an integrated computing system 112 associated with each integrated computing system definition 110 and adding the shipping handling fee to the cumulative costs of the constituent components to derive the estimated cost that is displayed in the cost column 1024c.

The workgroup display screen 1020 also includes a go back button 1026 and a print form button 1028. The go back button 1026, when selected, causes the application 104 to revert back to the previous screen, such as the workgroup selection screen 1000 of FIG. 10A. The print form button 1028, when selected, causes the application 104 to print the information included in the ordered list window 1022 to a suitable destination, such as to a file that can be accessed by another executable program, such as a word processor or a spreadsheet program, or to a printer for generating a hardcopy of the information included in the ordered list window 1022.

Although FIGS. 10A and 10B illustrate example screens that may be used for receiving user input for organizing multiple integrated computing system definitions 110 in a workgroup 130, the application 104 may display additional, fewer, or different screens or information included in those screens without departing from the spirit and scope of the present disclosure. For example, the application 104 may display other screens for manipulating or otherwise managing the workgroups, such as exporting the workgroups 1002 to other executable applications, combining multiple workgroups 1002 into a single workgroup 130, and/or splitting a single workgroup 130 into multiple workgroups 1002.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 11:
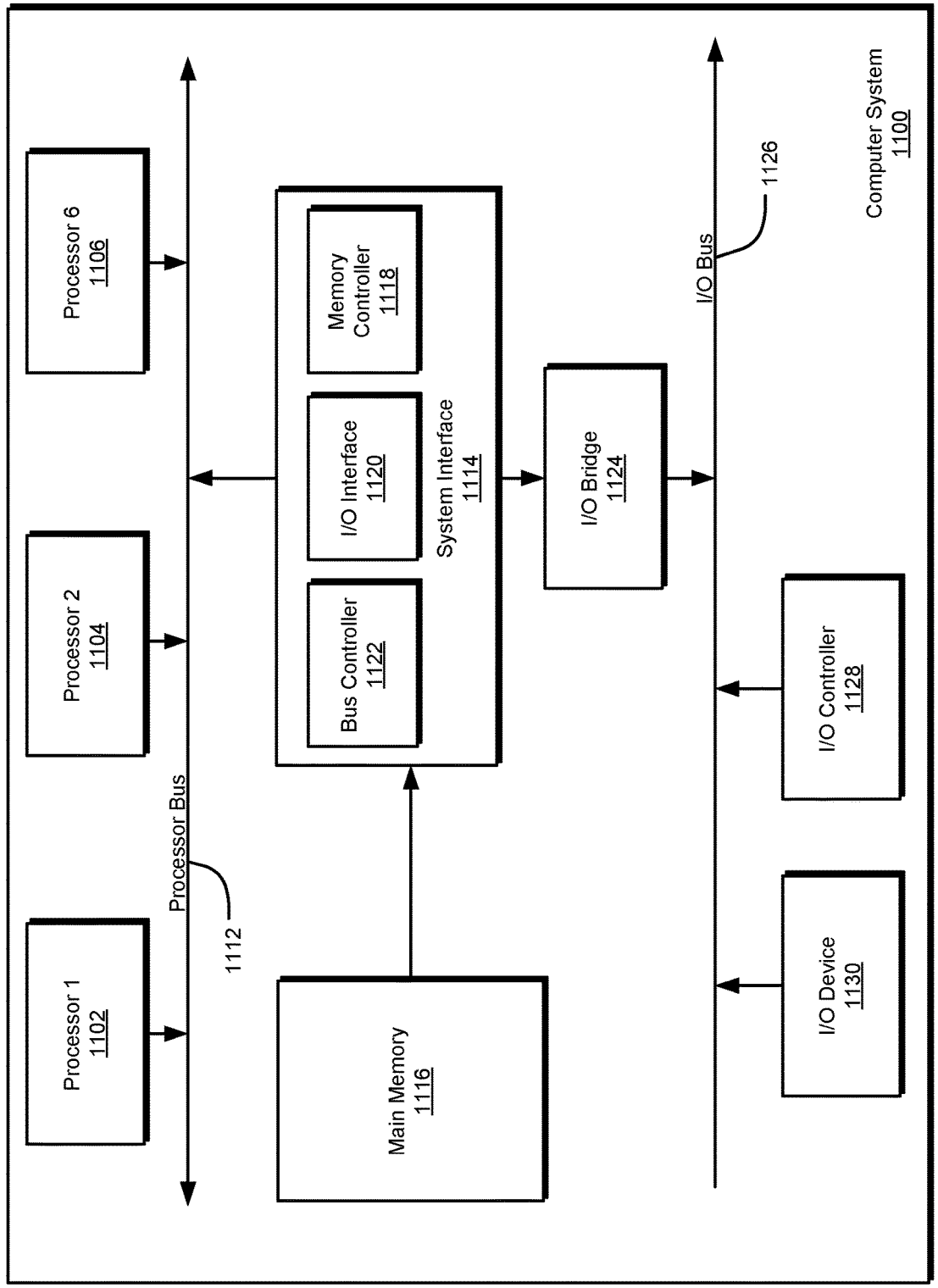
FIG. 11 is a block diagram illustrating an example of a computing device or computer system which may be used in implementing the embodiments of the present disclosure.

For example, FIG. 11 is a block diagram illustrating an example of a host or computer system 1100 which may be used in implementing the embodiments of the present disclosure. The computer system (system) includes one or more processors 1102-1106. Processors 1102-1106 may include one or more internal levels of cache (not shown) and a bus controller or bus interface unit to direct interaction with the processor bus 1112. Processor bus 1112, also known as the host bus or the front side bus, may be used to couple the processors 1102-1106 with the system interface 1114. System interface 1114 may be connected to the processor bus 1112 to interface other components of the system 1100 with the processor bus 1112. For example, system interface 1114 may include a memory controller 1118 for interfacing a main memory 1116 with the processor bus 1112. The main memory 1116 typically includes one or more memory cards and a control circuit (not shown). System interface 1114 may also include an input/output (I/O) interface 1120 to interface one or more I/O bridges or I/O devices with the processor bus 1112. One or more I/O controllers and/or I/O devices may be connected with the I/O bus 1126, such as I/O controller 1128 and I/O devices 1130, as illustrated.

I/O device 1130 may also include an input device (not shown), such as an alphanumeric input device, including alphanumeric and other keys for communicating information and/or command selections to the processors 1102-1106. Another type of user input device includes cursor control, such as a mouse, a trackball, or cursor direction keys for communicating direction information and command selections to the processors 1102-1106 and for controlling cursor movement on the display device.

System 1100 may include a dynamic storage device, referred to as main memory 1116, or a random access memory (RAM) or other computer-readable devices coupled to the processor bus 1112 for storing information and instructions to be executed by the processors 1102-1106. Main memory 1116 also may be used for storing temporary variables or other intermediate information during execution of instructions by the processors 1102-1106. System 1100 may include a read only memory (ROM) and/or other static storage device coupled to the processor bus 1112 for storing static information and instructions for the processors 1102-1106. The system set forth in FIG. 11 is but one possible example of a computer system that may employ or be configured in accordance with aspects of the present disclosure.

According to one embodiment, the above techniques may be performed by computer system 1100 in response to processor 1104 executing one or more sequences of one or more instructions contained in main memory 1116. These instructions may be read into main memory 1116 from another machine-readable medium, such as a storage device. Execution of the sequences of instructions contained in main memory 1116 may cause processors 1102-1106 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 1116. Common forms of machine-readable medium may include, but is not limited to, magnetic storage medium (e.g., hard disk drive); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An integrated computing system configuration system comprising:
a computing system comprising a processor and a memory to store instructions that are executed by the processor to:
receive, via a user interface, a plurality of component definitions associated with a corresponding plurality of components of a customized integrated computing system;
form a first sub-system definition from the received component definitions, wherein the first sub-system definition represents a first sub-system of the customized integrated computing system;
resolve at least one dependency conflict between two or more component definitions of the first sub-system definition;
form a second sub-system definition from the received component definitions, wherein the second sub-system definition represents a second sub-system of the customized integrated computing system;
resolve at least one dependency conflict between two or more component definitions of the second sub-system definition; and
display, on a display device and via the user interface, a report associated with an operational difference between the first sub-system definition and the second sub-system definition.

2. The integrated computing system configuration system of claim 1, wherein the instructions are further executed to identify at least one external dependency of a component definition of the first sub-system definition to a component definition of the second sub-system definition and store an identification of the external dependency in a metadata portion of each component definition, wherein the displayed report comprises the stored external dependency.

3. The integrated computing system configuration system of claim 2, wherein the instructions are further executed to receive, via the user interface, a selection of the first sub-system definition into the customized integrated computing system and display, on the display device, the received component definitions as comprising the customized integrated computing system.

4. The integrated computing system configuration system of claim 3, wherein the instructions are further executed to determine whether the customized integrated computing system comprises a valid integrated computing system definition, the displayed report comprising an indication of the results of the determination of validity of the integrated computing system definition.

5. The integrated computing system configuration system of claim 4, wherein determining the validity of the integrated computing system definition comprises instructions further executed to resolve, based on a selection received via the user interface, an internal dependency of the component definitions in the first sub-system definition and the external dependency of the component definitions to the second sub-system definition.

6. The integrated computing system configuration system of claim 5, wherein the instructions are further executed to display, in the displayed report and based on a determined failed validation of the integrated computing system definition, at least one operational characteristic of a component definition of the customized integrated computing system.

7. The integrated computing system configuration system of claim 6, wherein the instructions are further executed to display, in the displayed report and based on the determined failed validation of the integrated computing system definition, at least one modification of the component definition of the customized integrated computing system.

8. A method for generating a integrated computing system configuration definition, the method comprising:
receiving, via a user interface executed on a computing device based on one or more instructions stored in a memory and executed by at least one processor, a plurality of component definitions associated with a corresponding plurality of components of a customized integrated computing system;
forming a first sub-system definition from the received component definitions, wherein the first sub-system definition represents a first sub-system of the customized integrated computing system;
resolving at least one dependency conflict between two or more component definitions of the first sub-system definition;
forming a second sub-system definition from the received component definitions, wherein the second sub-system definition represents a second sub-system of the customized integrated computing system;
resolving at least one dependency conflict between two or more component definitions of the second sub-system definition; and
displaying, on a display device of the computing device and via the user interface, a report associated with an operational difference between the first sub-system definition and the second sub-system definition.

9. The method of claim 8 further comprising:
identifying at least one external dependency of a component definition of the first sub-system definition to a component definition of the second sub-system definition; and
storing an identification of the external dependency in a metadata portion of each component definition, wherein the displayed report comprises the stored external dependency.

10. The method of claim 9 further comprising:
receiving, via the user interface executed on the computing device, a selection of the first sub-system definition into the customized integrated computing system; and
displaying, on the display device, the received component definitions as comprising the customized integrated computing system.

11. The method of claim 10 further comprising:
determining a validity of the customized integrated computing system definition, the displayed report comprising an indication of the results of the determination of validity of the integrated computing system definition.

12. The method of claim 11 wherein determining the validity of the integrated computing system definition comprises resolving, based on a selection received via the user interface, an internal dependency of the component definitions in the first sub-system definition and the external dependency of the component definitions to the second sub-system definition.

13. The method of claim 12 further comprising:
displaying, in the displayed report and based on a determined failed validation of the integrated computing system definition, at least one operational characteristic of a component definition of the customized integrated computing system.

14. The method of claim 13 further comprising:
displaying, in the displayed report and based on the determined failed validation of the integrated computing system definition, at least one modification of the component definition of the customized integrated computing system.

15. Code implemented in a non-transitory, computer readable medium that when executed by a processor, is operable to perform at least the following:
receiving, via a user interface, a plurality of component definitions associated with a corresponding plurality of components of a customized integrated computing system;
forming a first sub-system definition from the received component definitions, wherein the first sub-system definition represents a first sub-system of the customized integrated computing system;
resolving at least one dependency conflict between two or more component definitions of the first sub-system definition;
forming a second sub-system definition from the received component definitions, wherein the second sub-system definition represents a second sub-system of the customized integrated computing system;
resolving at least one dependency conflict between two or more component definitions of the second sub-system definition; and
displaying, on a display device of a computing device and via the user interface, a report associated with an operational difference between the first sub-system definition and the second sub-system definition.

16. The code of claim 15, further operable to perform identifying at least one external dependency of a component definition of the first sub-system definition to a component definition of the second sub-system definition; and storing an identification of the external dependency in a metadata portion of each component definition, wherein the displayed report comprises the stored external dependency.

17. The code of claim 16, further operable to perform receiving, via the user interface executed on the computing device, a selection of the first sub-system definition into the customized integrated computing system; and displaying, on the display device, the received component definitions as comprising the customized integrated computing system.

18. The code of claim 17, further operable to perform determining a validity of the customized integrated computing system definition, the displayed report comprising an indication of the results of the determination of validity of the integrated computing system definition.

19. The code of claim 18, wherein determining the validity of the integrated computing system definition comprises resolving, based on a selection received via the user interface, an internal dependency of the component definitions in the first sub-system definition and the external dependency of the component definitions to the second sub-system definition.

20. The code of claim 19, further operable to perform displaying, in the displayed report and based on a determined failed validation of the integrated computing system definition, at least one operational characteristic of a component definition of the customized integrated computing system.

* * * * *